(12) United States Patent
Takagawa et al.

(10) Patent No.: US 11,914,075 B2
(45) Date of Patent: Feb. 27, 2024

(54) DISTANCE MEASUREMENT APPARATUS

(71) Applicant: Mitsubishi Electric Corporation, Tokyo (JP)

(72) Inventors: Yosuke Takagawa, Tokyo (JP); Masahiro Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1288 days.

(21) Appl. No.: 16/445,358

(22) Filed: Jun. 19, 2019

(65) Prior Publication Data
US 2020/0033452 A1 Jan. 30, 2020

(30) Foreign Application Priority Data
Jul. 24, 2018 (JP) .................................. 2018-138162

(51) Int. Cl.
| G02B 26/08 | (2006.01) |
| G02B 26/10 | (2006.01) |
| G01S 7/481 | (2006.01) |
| G01S 7/484 | (2006.01) |
| G01S 17/10 | (2020.01) |

(52) U.S. Cl.
CPC ............ *G01S 7/4817* (2013.01); *G01S 7/484* (2013.01); *G01S 17/10* (2013.01); *G02B 26/0816* (2013.01); *G02B 26/101* (2013.01)

(58) Field of Classification Search
CPC ...... G01S 7/4972; G01S 7/4817; G01S 7/484; G01S 7/10; G01B 11/24; G01B 11/2441; G01B 9/02; G01B 9/02004; G01B 9/02059; G01B 9/02057; G01B 9/02078; G02B 26/101
See application file for complete search history.

(56) References Cited

U.S. PATENT DOCUMENTS

| 11,300,683 B2 * | 4/2022 | Bao ........................ G01S 7/4865 |
| 2017/0276771 A1 * | 9/2017 | Hayami ................ G01S 7/4817 |

FOREIGN PATENT DOCUMENTS

| JP | 2003215244 A | 7/2003 |
| JP | 2003-344553 A | 12/2003 |
| JP | 2006515925 A | 6/2006 |
| JP | 2010-164954 A | 7/2010 |
| JP | 2011-95208 A | 5/2011 |
| JP | 2012-68066 A | 4/2012 |

(Continued)

Primary Examiner — Mustak Choudhury
(74) Attorney, Agent, or Firm — Sughrue Mion, PLLC; Richard C. Turner

(57) ABSTRACT

A distance measurement apparatus includes: a laser light source configured to emit emitted light to be applied to an object to be measured; a laser light source control circuit configured to control the laser light source; a MEMS mirror configured to two-dimensionally scan the object with the emitted light; a reflecting member configured to cover a part of a scan region, and reflect the emitted light; and a light detector configured to receive reflected light from the object to be measured and reflected light from the reflecting member, and output a received light signal. The laser light source control circuit sets, to a threshold value, an amount of the emitted light obtained when output of the light detector is saturated, and controls an amount of the emitted light such that the amount of the emitted light is less than the threshold value.

13 Claims, 17 Drawing Sheets

(56) References Cited

FOREIGN PATENT DOCUMENTS

| | | | |
|---|---|---|---|
| JP | 5638345 | B2 | 12/2014 |
| JP | 2016033482 | A * | 3/2016 |
| JP | 2016033482 | A | 3/2016 |
| JP | 2018-44853 | A | 3/2018 |

* cited by examiner

DISTANCE MEASUREMENT APPARATUS

BACKGROUND OF THE INVENTION

1. Field of the Invention

The present disclosure relates to a distance measurement apparatus for measuring a distance to an object based on reflected light obtained by applying light beam such as laser light to the object to be measured.

2. Description of the Background Art

To date, a distance measurement apparatus that applies light beam such as laser light to an object to be measured, to measures a distance to the object based on light reflected by the object, has been known. As such a distance measurement apparatus, a scanning-type distance measurement apparatus that causes scanning means to scan a specific range on an object with laser light from a light source is known. As the scanning means, for example, a device in which a rotatable polygon mirror and a galvanometer mirror moving in synchronization with the polygon mirror are combined with each other, is known. In recent years, a device using a micro-electro-mechanical systems (MEMS) mirror is also used. A MEMS mirror is advantageous since the MEMS mirror can be used for performing detailed scanning. However, in a MEMS mirror, characteristics of mechanical vibration components and optics change due to environmental factors such as temperature change, so that laser light may not reach a predetermined scan point as desired. If a scan position of laser light is greatly deviated, a distance measurement may be hindered. For example, an object to be measured cannot be detected. Therefore, the deviation of a scan position needs to be immediately detected and eliminated.

Therefore, it is suggested that light receiving means is disposed at a scan point of laser light, and receives laser light for scanning, to correct deviation of a scan position as appropriate (see, for example, Patent Document 1).

Furthermore, it is suggested that a reference reflector is disposed at a position that is distant by a fixed reference distance from a laser light scanning optical system in a laser light scanning unit, and a scanning width of transmission beam is derived based on reception intensity of light reflected by the reference reflector, and the scanning width by the laser light scanning optical system is controlled (see, for example, Patent Document 2).

Patent Document 1: Japanese Laid-Open Patent Publication No. 2010-164954
Patent Document 2: Japanese Patent No. 5638345

SUMMARY OF THE INVENTION

However, in a case where the technique disclosed in Patent Document 1 is applied to a distance measurement apparatus, light receiving means is provided separately from a light detector for reflected light. Therefore, the structure becomes complicated, and reduction of size and cost of the distance measurement apparatus is hindered.

In the technique disclosed in Patent Document 2, temperature dependency of output sensitivity of a light receiver is not considered. Therefore, intensity of a received light signal generated from light reflected by the reference reflector becomes excessively high due to temperature change of the ambient environment, and output from a light detector may be saturated. A reflectance of the reference reflector may be set to be less than or equal to a certain value to prevent saturation of the output. However, when the reflectance of the reference reflector is reduced, an amount of light absorbed from laser light by the reference reflector and heat generation caused by the absorption of the laser light are increased, and the reference reflector may be deformed and subjected to aged deterioration, to change the reflectance. Change of reflectance of the reference reflector exerts an influence on a received light signal outputted by the light detector and hinders accurate measurement of an intensity of reflected light, and thus hinders accurate detection of deviation of a scan position.

The present disclosure has been made to solve the aforementioned problem, and an object of the present disclosure is to provide a distance measurement apparatus capable of detecting deviation of a scan position with a simple structure at enhanced accuracy.

A distance measurement apparatus according to one aspect of the present disclosure is directed to a distance measurement apparatus for applying laser light to an object to be measured, and measuring a distance to the object to be measured, based on light reflected by the object to be measured, and the distance measurement apparatus includes: a laser light source configured to emit the laser light; laser light source control means for controlling the laser light source; scanning means for two-dimensionally scanning the object to be measured, with the laser light; a casing configured to store the scanning means; an opening formed in the casing, the opening being opened toward the object to be measured, the opening allowing the object to be measured to be exposed to the scanning means; reflecting means, fixed to the casing, for covering a part of a scan region by the laser light or a periphery of the scan region, and reflecting the laser light; and light receiving means for receiving light reflected by the object to be measured and light reflected by the reflecting means, and outputting a received light signal, and the laser light source control means sets, to a threshold value, an amount of the laser light obtained when output of the light receiving means is saturated, and controls an amount of the laser light emitted by the laser light source such that the amount of the laser light emitted by the laser light source is less than the threshold value.

The technique disclosed in the present disclosure allows deviation of a scan position to be detected with a simple structure at enhanced accuracy.

DETAILED DESCRIPTION OF THE PREFERRED EMBODIMENTS OF THE INVENTION

First Embodiment

Figure 1:
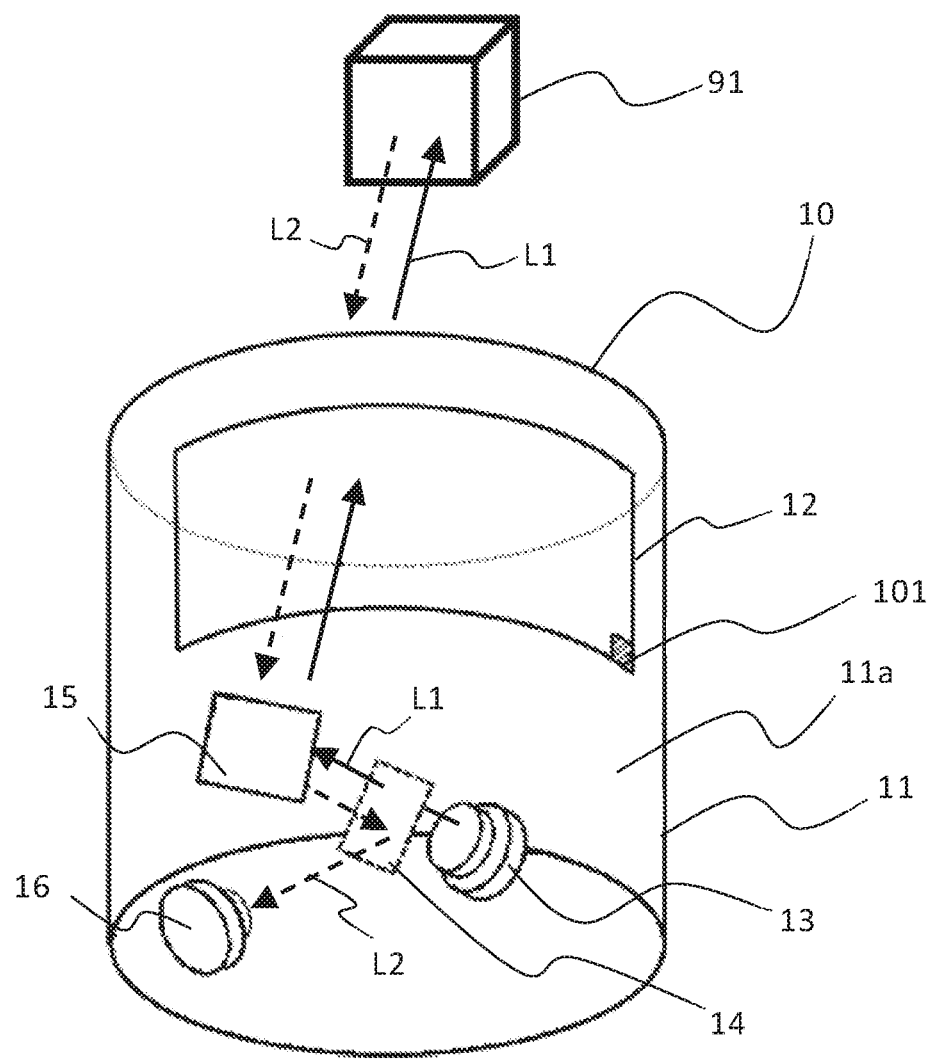
FIG. 1 is a schematic diagram illustrating a configuration of a distance measurement apparatus according to a first embodiment.

A first embodiment will be described below with reference to FIG. 1 to FIG. 12. FIG. 1 is a schematic diagram illustrating a configuration of a distance measurement apparatus according to the first embodiment. A distance measurement apparatus 10 is also referred to as a lidar (light detecting and ranging) or laser radar. The distance measurement apparatus 10 applies laser light to an object 91 to be measured, and receives light reflected by the surface of the object 91, to measure a distance to the object. In the below description, laser light applied to the object 91 is referred to as emitted light L1 and laser light reflected by the surface of the object 91 is referred to as reflected light L2. The distance measurement apparatus 10 includes: a laser light source 13 that emits laser light as the emitted light L1; and a MEMS mirror 15, i.e., scanning means, which reflects the emitted light L1 from the laser light source 13, two-dimensionally scans the surface of the object 91, reflects the reflected light L2 obtained by reflection by the surface of the object 91, and causes a light detector 16, i.e., light receiving means, to receive the reflected light. A light condenser mirror 14 is disposed between the laser light source 13 and the MEMS mirror 15. The light condenser mirror 14 is configured to allow the emitted light L1 from the laser light source 13 to be transmitted therethrough to the MEMS mirror 15, and reflect the reflected light L2 from the MEMS mirror 15 toward the light detector 16. The laser light source 13, the light condenser mirror 14, the MEMS mirror 15, and the light detector 16 are stored in, for example, a cylindrical casing 11. A window portion 12, i.e., an opening, which is open toward the object 91 and which allows the object 91 to be exposed to the MEMS mirror 15, is disposed in a side wall 11a of the casing 11. Furthermore, a reflecting member 101, i.e., reflecting means, which has, for example, a square-plate-like shape and reflects the emitted light L1 is mounted at one corner of the window portion 12.

The laser light source 13 emits laser light having a near infrared wavelength. The wavelength and a method for applying laser light are not limited thereto. Any configuration in which scanning can be performed with emitted laser light can be used.

The emitted light L1 from the laser light source 13 reaches the MEMS mirror 15 through the light condenser mirror 14, and is reflected toward the object 91 by the MEMS mirror 15. The emitted light L1 reflected by the MEMS mirror 15 propagates outward from the casing 11 through the window portion 12 and is applied to the surface of the object 91. The object 91 reflects the emitted light L1 by the surface of the object 91 as the reflected light L2. The reflected light L2 enters the casing 11 through the window portion 12, and is reflected by the MEMS mirror 15 toward the light condenser mirror 14. The light condenser mirror 14 reflects the reflected light L2 from the MEMS mirror toward the light detector 16. The light detector 16 includes, for example, an avalanche photo diode (APD) as a light receiving element, and receives the reflected light L2 from the light condenser mirror 14, and outputs a received light signal corresponding to the reflected light L2 having been received.

In the MEMS mirror 15, the reflection surface is movable, and a direction in which the emitted light L1 is reflected is determined according to an angle of reflection of the MEMS mirror 15. The angle of reflection of the MEMS mirror 15 is determined according to a driving angle therefor. Therefore, when the MEMS mirror 15 oscillates at a driving angle in a predetermined range, the emitted light L1 is reciprocated to perform scanning in a predetermined region. With the emitted light L1, the object 91 outside the casing 11 is thus scanned, and the emitted light L1 is reflected by the surface of the object 91. A direction in which the reflected light L2 is reflected is also adjusted according to an angle of reflection of the MEMS mirror 15, and the reflected light L2 is incident on the light detector 16. Thus, the reflected light L2 from the object 91 is received by the light detector 16, and information on a distance to the object 91 and an intensity of reflected light can be obtained.

Figure 2:
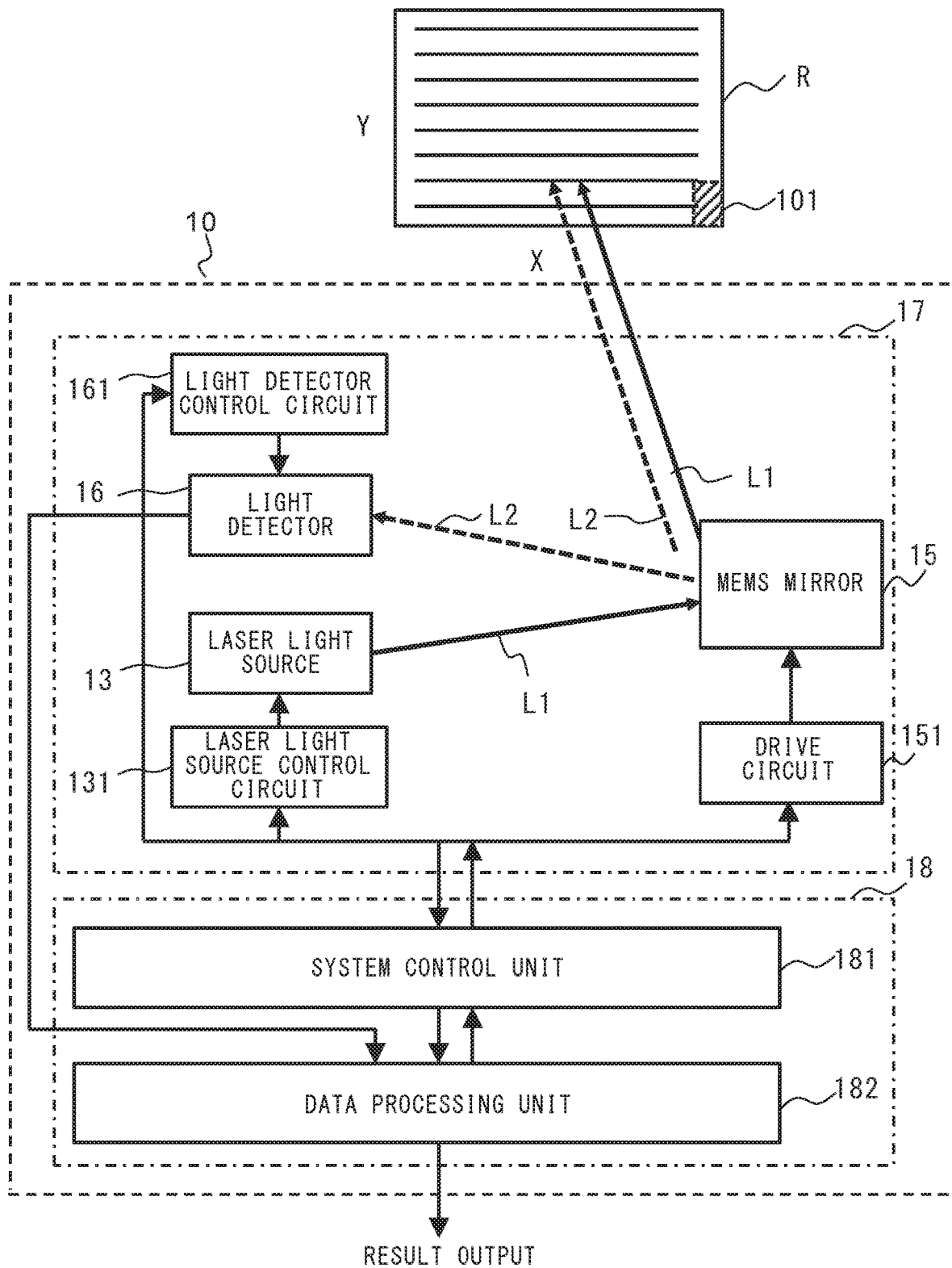
FIG. 2 is a functional block diagram illustrating the distance measurement apparatus according to the first embodiment.

FIG. 2 is a functional block diagram illustrating the distance measurement apparatus according to the first embodiment. The distance measurement apparatus 10 includes: a distance measurement unit 17 that applies the emitted light L1 to a scan region R, and receives the reflected light L2; and a control unit 18 that controls the distance measurement unit 17 and processes data from the distance measurement unit 17. The scan region R is a region as seen from the MEMS mirror 15 in the casing 11, and is formed on the surface of the object 91 except for a position at which the reflecting member 101 is mounted. That is, the reflecting member 101 covers a part of the scan region by laser light. The distance measurement unit 17 includes: the laser light source 13; a laser light source control circuit 131, i.e., laser light source control means, which drive-controls the laser light source 13; the MEMS mirror 15, a drive circuit 151 that drives the MEMS mirror 15; the light detector 16, and a light detector control circuit 161 that controls the light detector 16. The laser light source control means comprises a processor for executing a program, and a storage device in which the program is stored, the processor executing the program to perform the operation of controlling the laser light source. The control unit 18 includes: a system control unit 181 that controls the entirety of the system including the laser light source control circuit 131, the drive circuit 151, and the light detector control circuit 161; and a data processing unit 182 that process obtained data, performs correction calculation using data, and outputs the result.

The laser light source 13 is driven by the laser light source control circuit 131 for light emission, and emits the emitted light L1 that is laser light having a near infrared wavelength. The MEMS mirror 15 is driven to rotate by the drive circuit 151, and rotates the reflection surface to reflect the emitted light L1 in a predetermined direction, and performs scanning with the emitted light L1 in a predetermined scan region R. The emitted light L1 with which the scan region R is scanned, is reflected as the reflected light L2 toward the MEMS mirror 15. The MEMS mirror 15 is driven by the drive circuit 151 to rotate to form an angle of reflection, which is different from an angle for the light emission, and reflects the reflected light L2 toward the light detector 16. The light detector 16 is controlled by the light detector control circuit 161 to receive the reflected light L2 and output the received light signal to the data processing unit 182.

The laser light source control circuit 131 controls the laser light source 13 such that an amount of the emitted light L1 has a value less than a predetermined threshold value Th. The threshold value Th represents an amount of light at which the output of the light detector 16 is saturated. In order to perform such a control, for example, feedback control for a received light signal that is output from the light detector 16 may be performed. That is, the data processing unit 182 monitors the intensity of the received light signal, and issues warning to the system control unit 181 when a difference from the threshold value Th is less than or equal to a predetermined value. The system control unit 181 that has received the warning instructs the laser light source control circuit 131 to reduce an amount of the emitted light L1. For example, the laser light source control circuit 131 shortens a pulse width of the emitted light L1 as compared to a normal pulse width according to the instruction from the system control unit 181, to reduce an amount of the emitted light L1. An amount of the emitted light L1 may be reduced by lowering a power source voltage inputted to the laser light source 13 as compared to a normal one. The above-described control of an amount of the emitted light L1 can be performed at timing when the reflecting member 101 is scanned with the emitted light L1, and the light detector 16 receives the reflected light L2 from the reflecting member 101.

In the first embodiment, the scan region R is a rectangular region on an X-Y plane. While the MEMS mirror 15 allows the emitted light L1 to reciprocate to perform scanning in the X direction, i.e., a first direction, the MEMS mirror 15 allows scanning in the Y direction, i.e., a second direction. Thus, the scan region R is scanned with the emitted light L1 so as to form a predetermined scanning pattern. In the first embodiment, the scan region R shown in FIG. 2 corresponds to the window portion 12 shown in FIG. 1, and the lower right corner of the scan region R corresponds to the position at which the reflecting member 101 is mounted. Thus, the emitted light L1 is reflected by the reflecting member 101 at the lower right corner of the scan region R, and is reflected by the surface of the object 91 at the other positions. The shape of the scan region R and the scanning direction are examples, and are not particularly limited.

Figure 3:
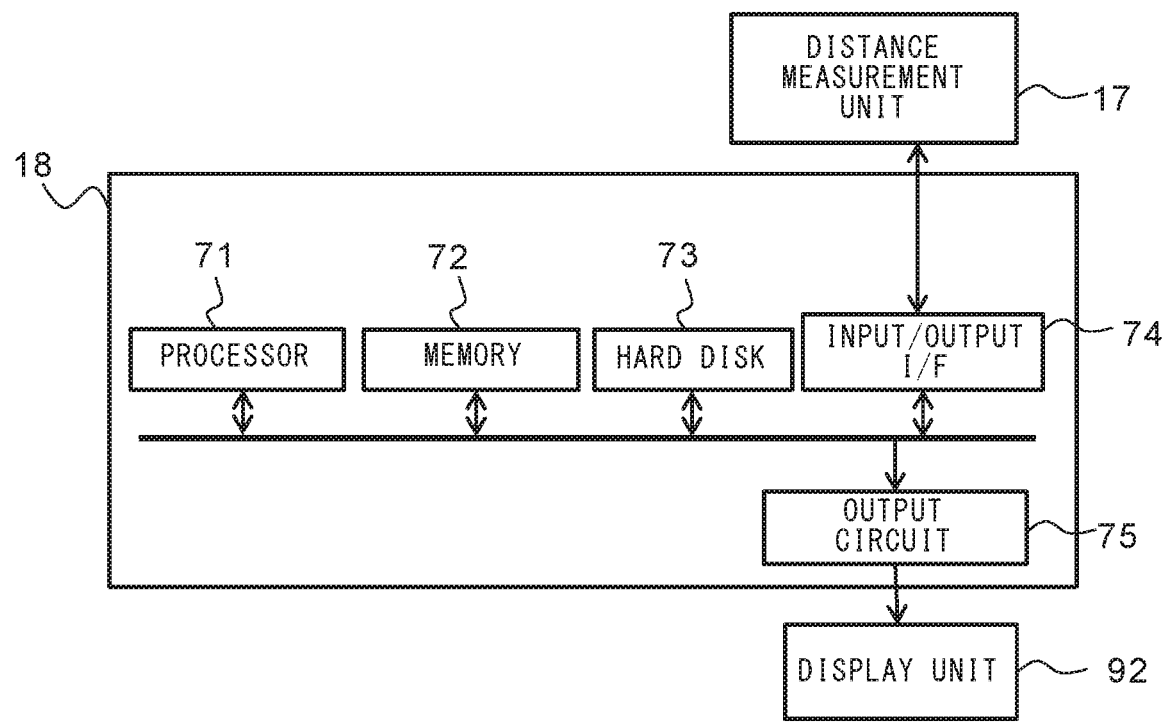
FIG. 3 illustrates a hardware configuration of a control unit according to the first embodiment.

FIG. 3 illustrates an example of a hardware configuration for implementing the control unit 18. The control unit 18 functions by a processor 71 executing a program stored in a memory 72 or a hard disk 73. The control unit 18 may function by a plurality of processors 71, and a plurality of memories 72 or hard disks 73 being operated in conjunction with each other. Data from the distance measurement unit 17 and results of calculation using the data are stored in the memory 72 or the hard disk 73. The control unit 18 includes an input/output interface 74 (input/output I/F 74), and performs transmission and reception of data and control instructions between the control unit 18 and the distance measurement unit 17 via the input/output I/F 74. Furthermore, the control unit 18 includes an output circuit 75 that outputs a measurement result and the like and that causes an external display unit 92 to display the measurement result and the like.

Figure 4A:
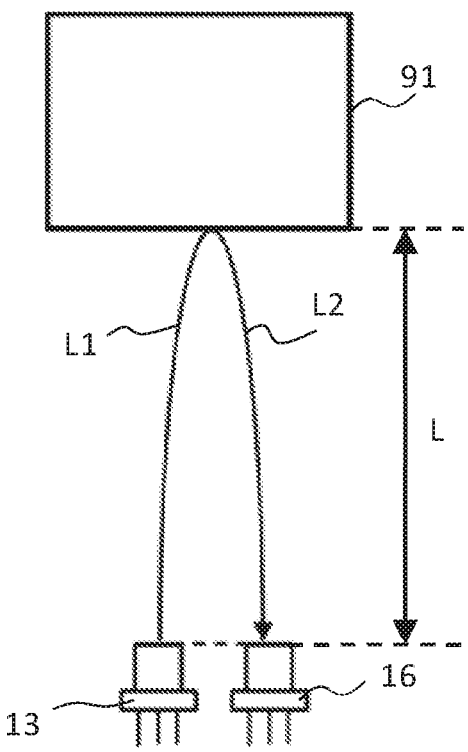
FIG. 4A illustrates a distance measurement method according to the first embodiment.
Figure 4B:
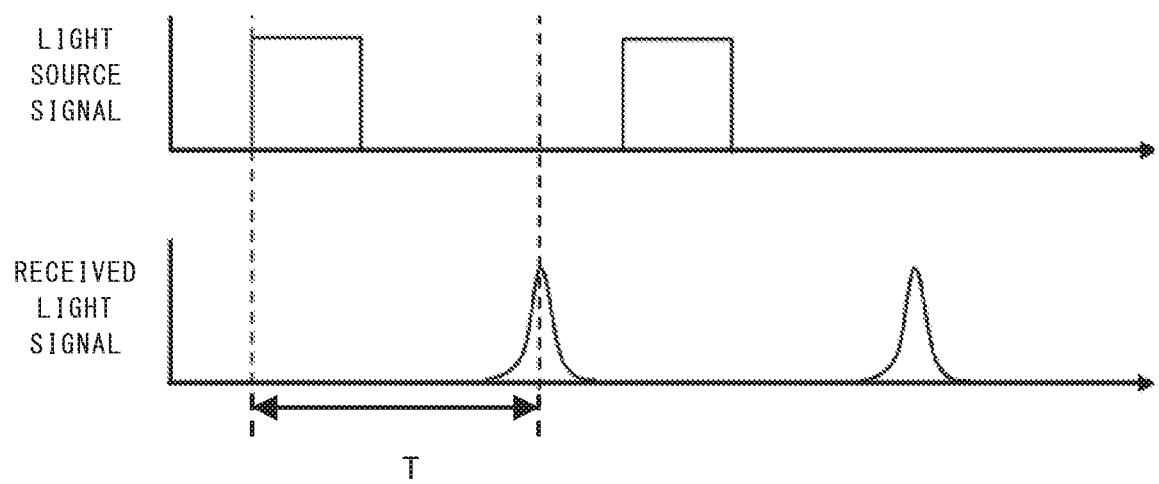
FIG. 4B illustrates the distance measurement method according to the first embodiment, and illustrates a relationship between a light source signal and a received light signal.

A distance measurement method performed by the distance measurement apparatus 10 will be described. FIG. 4A schematically illustrates a distance measurement method according to the first embodiment, and illustrates only a portion associated with distance measurement. Other portions are not illustrated. A distance L to the object 91 from each of the laser light source 13 and the light detector 16 is almost the same. FIG. 4B illustrates a relationship between a light source signal based on the emitted light L1 from the laser light source 13 and a received light signal based on the reflected light L2 received by the light detector 16. As shown in FIG. 4A, when the emitted light L1 from the laser light source 13 is reflected by the surface of the object 91, and the reflected light L2 is received by the light detector 16, a time T from rising of the light source signal to the peak of the received light signal is a time required for laser light from the laser light source 13 to propagate over a distance 2L. Therefore, the time T is multiplied by the speed of light and the obtained value is divided by two, whereby the distance L to the object 91 can be obtained. In the distance measurement apparatus 10, a time period from a time at which the system control unit 181 transmits, to the laser light source control circuit 131, a control instruction for causing the laser light source 13 to start pulse emission, up to a time at which the light detector 16 receives the reflected light L2 to output a received light signal to the data processing unit 182 is measured as a light reception time. The light reception time is equal to the time T. Therefore, the light reception time is multiplied by the speed of light and the obtained value is divided by two, to calculate the distance L to the object 91.

Figure 5:
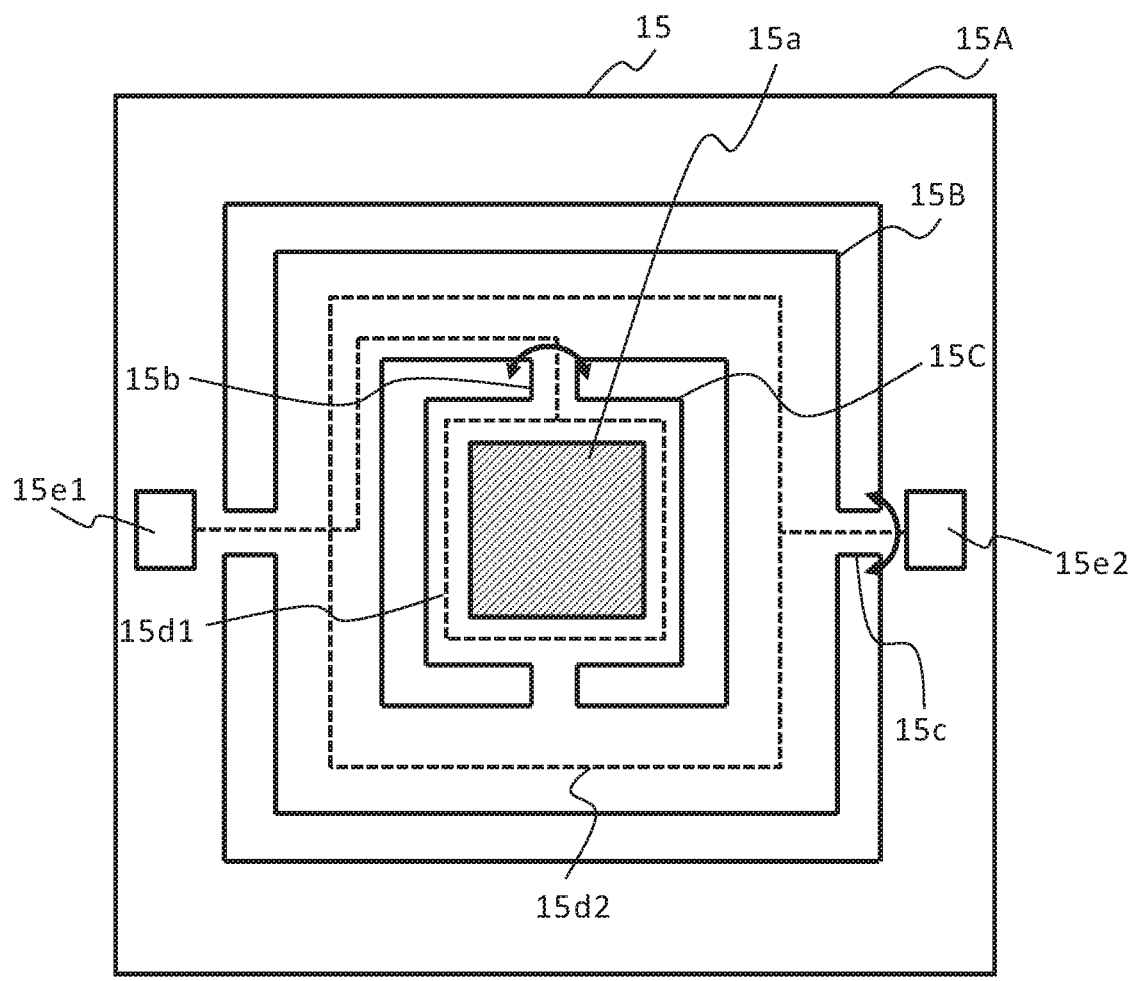
FIG. 5 illustrates a structure of a MEMS mirror according to the first embodiment.

Next, the MEMS mirror according to the first embodiment will be described. FIG. 5 illustrates a structure of the MEMS mirror according to the first embodiment. As shown in FIG. 5, the MEMS mirror 15 is formed by combining square-shaped frames 15A and 15B having the same center and having different sizes, respectively, with a plate-like member 15C disposed inward of the inner frame 15B. To the plate-like member 15C, a micro-mirror 15a having a reflection surface is fixed. The plate-like member 15C and the inner frame 15B are connected to each other by a torsion bar 15b. The inner frame 15B and the outer frame 15A are connected to each other by a torsion bar 15c. The torsion bar 15b, 15c is implemented by a member having elasticity, and serves as a torsion spring by twisting, and allows the micro-mirror 15a to rotationally oscillate about the axis line of the torsion bar 15b, 15c. The axial directions of the torsion bars 15b and 15c are orthogonal to each other. Rotational oscillations by the torsion bars 15b and 15c are combined with each other, thereby two-dimensionally changing a normal direction with respect to the micro-mirror 15a. Furthermore, a coil 15d1 is fixed to the plate-like member 15C, and a coil 15d2 is fixed to the inner frame 15B. The coils 15d1 and 15d2 are connected to electrode pads 15e1 and 15e2, respectively, disposed on the outer frame 15A, and electric current passes through the coils via the electrode pads, respectively.

The rotational oscillations by the torsion bars 15b and 15c are driven by applying, to the electrode pads 15e1 and 15e2, signals which have any frequencies and are transmitted from the drive circuit 151 shown in FIG. 2. That is, when electric current passes through the coil 15d1, 15d2 through the electrode pad 15e1, 15e2, Lorentz force is generated in the direction in which the torsion bar 15b, 15c is to be twisted, by the electric current and a magnetic force of a permanent magnet (not shown), according to Fleming's rule. The torsion bar 15b, 15c that is twisted by the Lorentz force, functions as a torsion spring as described above, to allow the micro-mirror 15a to rotationally oscillate. In the first embodiment, Lorentz force is used as a driving force for the micro-mirror 15a. However, the driving force for the micro-mirror 15a is not limited to an electromagnetic force such as Lorentz force. A piezoelectric driving manner using a piezoelectric element, or an electrostatic driving manner using electrostatic force due to difference in potential between a mirror and an electrode may be used.

Figure 6:
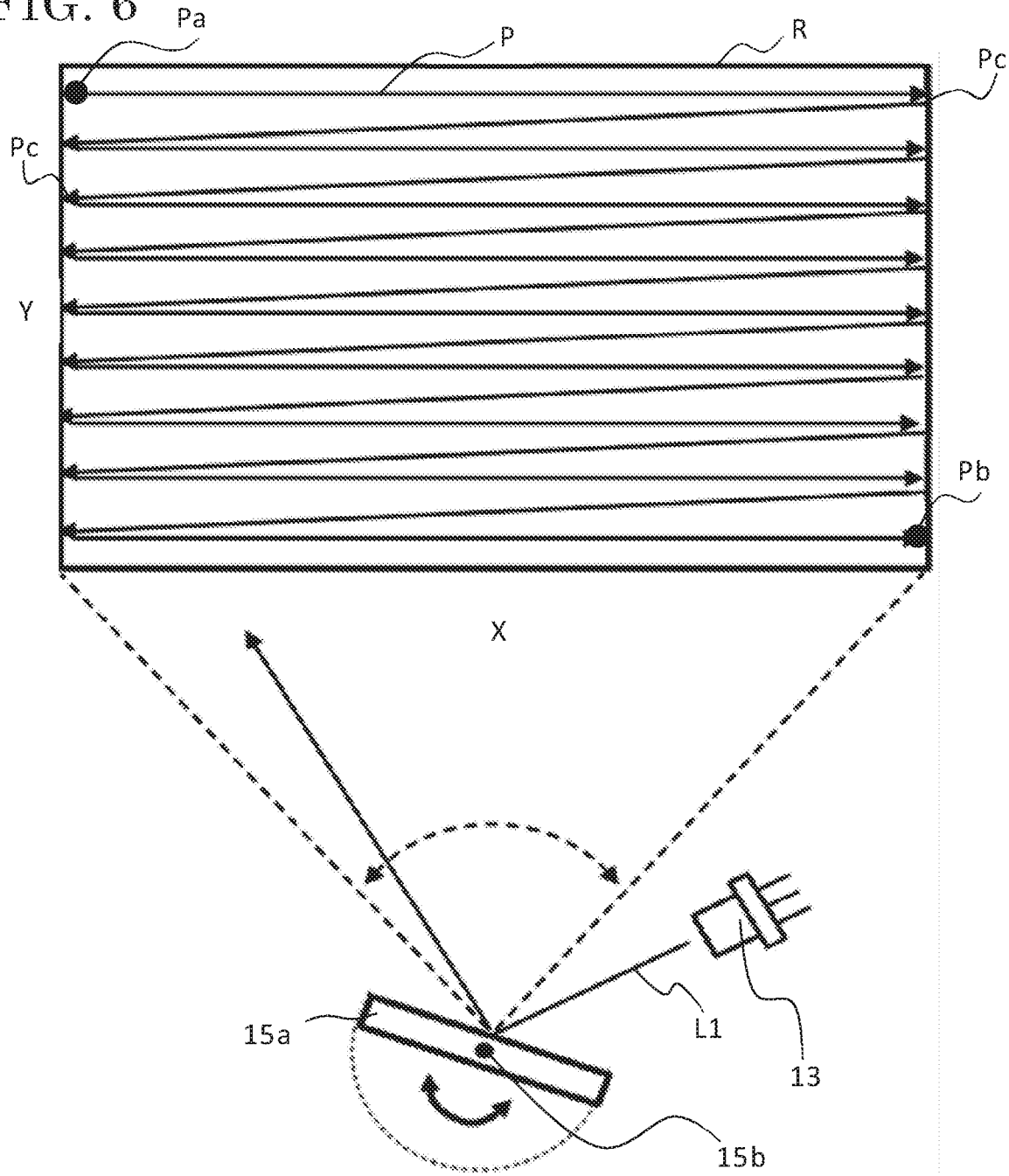
FIG. 6 illustrates a laser light scanning method according to the first embodiment.

Next, two-dimensional scanning with laser light by the MEMS mirror 15 will be described. FIG. 6 illustrates a laser light scanning method according to the first embodiment, and illustrates an exemplary case where a scanning pattern P is formed in the scan region R from a scan start position Pa to a scan end position Pb. In FIG. 6, only a portion associated with two-dimensional scanning with laser light is illustrated. The emitted light L1 from the laser light source 13 is reflected by the micro-mirror 15a of the MEMS mirror 15, and is applied to a specific scan point on the scan region R according to the reflecting direction by the MEMS mirror 15, i.e., the normal direction with respect to the micro-mirror 15a. As described above, the torsion bars 15b and 15c, which allow the micro-mirror 15a to rotationally oscillate, are orthogonal to each other, and function as torsion springs, respectively, thereby two-dimensionally changing the normal direction with respect to the micro-mirror 15a. Therefore, the emitted light L1 can be reciprocated to perform scanning in the X direction and the Y direction in the XY-coordinate system. More specifically, the micro-mirror 15a is rotationally oscillated about the axis line of the torsion bar 15b, whereby a scanning line is formed along the X direction while turning at the end of the scan region R as a turning position Pc, and scanning in the Y direction is performed by the micro-mirror 15a being rotated about the axis line of the torsion bar 15c. Thus, when the two torsion bars 15b and 15c are used, two-dimensional scanning with laser light is performed from the scan start position Pa to the scan end position Pb, to form the scanning pattern P that is a constant pattern. Furthermore, when the MEMS mirror 15 is used, Lissajous scanning or raster scanning can be also performed. When a spherical mirror is used, precessional scanning or the like can be performed. The range of the scan region R is determined by the angular displacement range of the micro-mirror 15a.

In the first embodiment, the MEMS mirror 15 is used to perform scanning with laser light. However, the scanning mode is not limited to, for example, a mechanical one. Furthermore, the micro-mirror 15a is rotationally oscillated about two axial directions, to enable one MEMS mirror 15 to perform two-dimensional scanning. However, a plurality of MEMS mirrors each of which enables scanning with laser light in one direction may be combined with each other. Furthermore, instead of a MEMS mirror, a motor may be used to perform scanning. The number of the laser light sources is not limited to one. A plurality of lasers may be used to perform scanning.

Figure 7A:
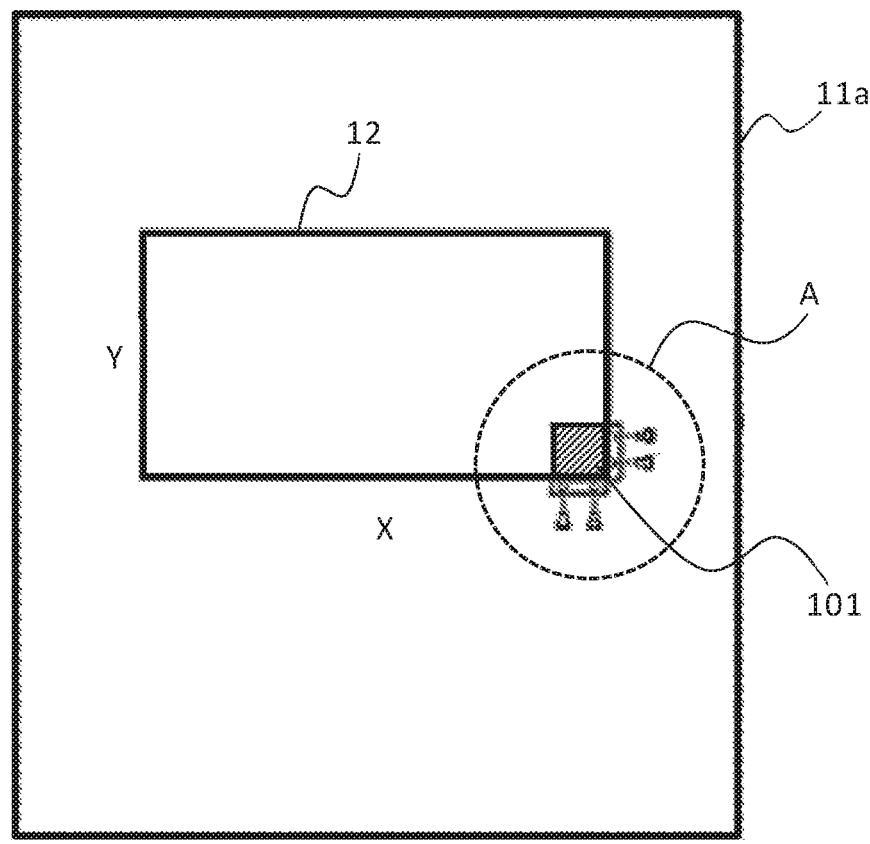
FIG. 7A illustrates an example of a reflecting member according to the first embodiment.
Figure 7B:
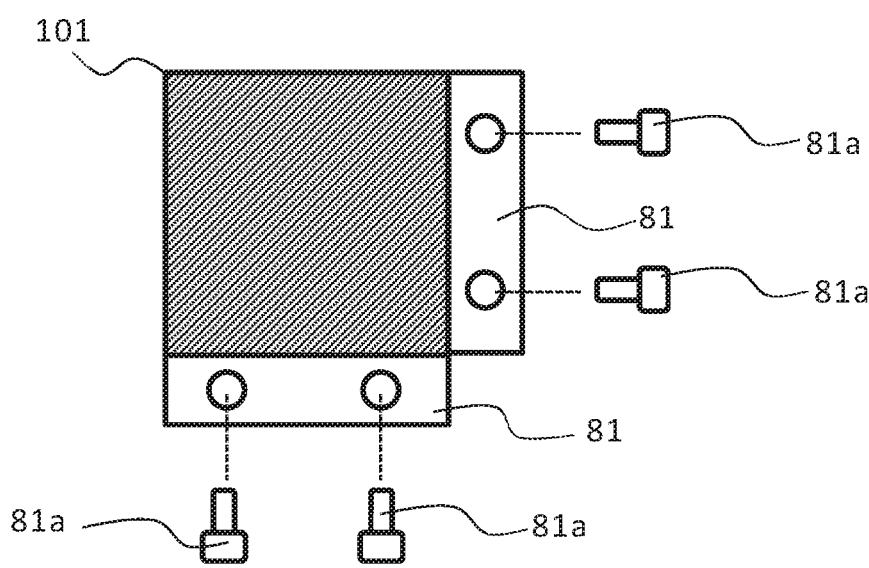
FIG. 7B is an enlarged view of a portion A shown in FIG. 7A.

Next, the reflecting member according to the first embodiment will be described. FIG. 7A illustrates an example of the reflecting member according to the first embodiment. FIG. 7B is an enlarged view of a portion A shown in FIG. 7A, and illustrates an exemplary case where the reflecting member 101 is mounted at the scan end position. As described below, in the first embodiment, the reflecting member 101 is disposed so as to correspond to the scan end position, and, thus, the reflecting member 101 is mounted at the lower right corner of the window portion 12 in FIG. 7A. The reflecting member 101 has screw holding portions 81 on two sides that contact with the side wall 11a of the casing 11, and the screw holding portions 81 each have two screw holes disposed along the reflecting member 101. Screws 81a as fastening members pass through the screw holes, respectively, and are screwed into the side wall 11a, thereby fixing the reflecting member 101. The number and the arrangement of the screw holes formed in the screw holding portion 81 are not limited to the number and arrangement described above.

The reflecting member 101 reflects the emitted light L1 as described above. The reflected light L2 from the reflecting member 101 functions as a position deviation detection signal when the scan position is deviated. Therefore, a material in which reflectance is less likely to change due to environmental factor such as temperature change and a position on which the emitted light L1 is incident, is advantageously used as a material of the reflecting member 101. When such a material is used, light can be constantly and uniformly reflected for the emitted light L1 from the laser light source 13, and a stable peak value which is less influenced by noise or the like can be obtained. Furthermore, the reflected light L2 from the side wall 11a and the reflected light L2 from the reflecting member 101 need to be discriminated from each other in consideration of possibility of the emitted light L1 being erroneously incident on the side wall 11a. Therefore, difference between a reflectance of the casing 11 and a reflectance of the reflecting member 101 is preferably great. For example, in a case where the casing 11 is made of a metal treated with black alumite, the reflectance of the casing 11 is about 15%. Therefore, zinc-plated steel plate having the reflectance of about 30% is used for the reflecting member 101.

When the reflectance becomes high, an amount of the reflected light L2 received by the light detector 16 increases. As described above, in the first embodiment, an amount of the emitted light L1 is controlled so as not to saturate the output of the light detector 16, so that the reflectance of the reflecting member 101 can be set to be high. Thus, emitted light L1 is inhibited from being absorbed by the reflecting member 101 and deformation and aged deterioration of the reflecting member due to heat generation of the reflecting member are also inhibited.

In the first embodiment, the reflecting member 101 is fixed by using the fastening member. However, a fixing member is provided on the reverse side of the reflection surface, and the fixing member and the side wall 11a may be fixed by an adhesive. In this case, the fixing member and the adhesive are provided so as not to be exposed as seen from the inside of the casing 11, to prevent the reflectance of the reflecting member 101 from being influenced. Furthermore, a reflecting member may be formed by the side wall 11a of the casing 11 being coated with a reflective material. Specifically, a part or the entirety of the periphery of the window portion 12 may be coated according to a direction of position deviation to be detected. In this case, when the scan region R deviates from the window portion 12 due to deviation of the scan position, the reflected light L2 reflected by the reflecting member can be received, whereby the same effect as that of the reflecting member 101 can be obtained.

Figure 8A:
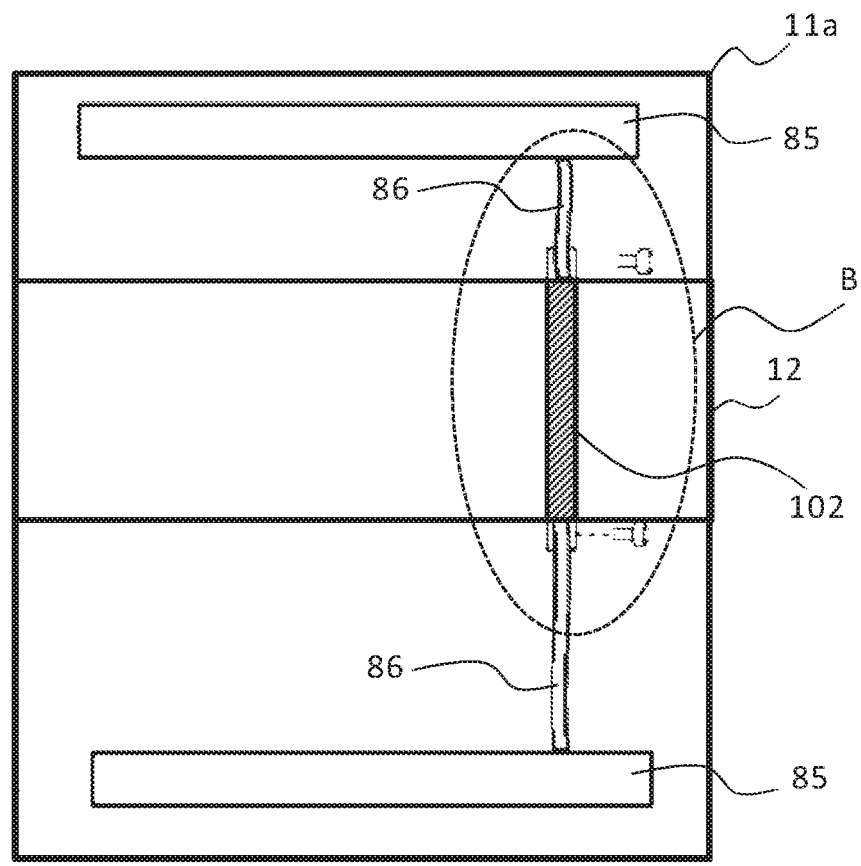
FIG. 8A illustrates another example of a reflecting member according to the first embodiment.
Figure 8B:
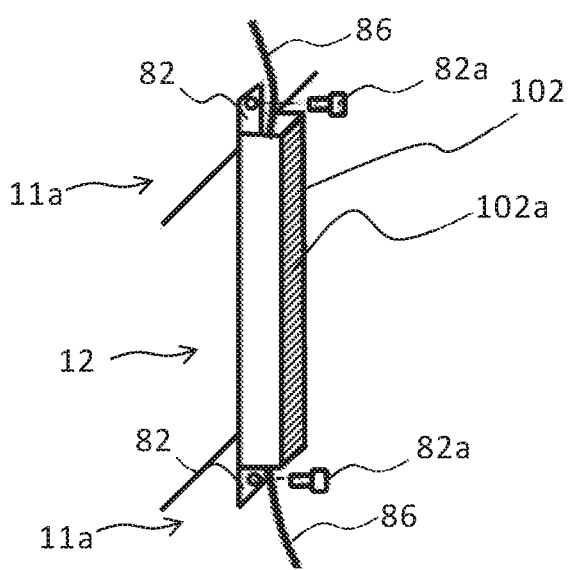
FIG. 8B is an enlarged view of a portion B shown in FIG. 8A.

FIG. 8A and FIG. 8B show another example of the reflecting member. In the example shown in FIG. 8A and FIG. 8B, a MEMS mirror serving as scanning means has a viewing angle of about 360 degrees and the window portion 12 extends over almost the entire periphery of the side wall 11a. In this case, a substrate 85 is separated into an upper part and a lower part so as to dispose the window portion 12 between the upper part and the lower part, and the upper and the lower substrates 85 are connected by wiring 86 that extends across the window portion 12 in the up-down direction. A reflecting member 102 has a hollow rectangular-parallelepiped shape and has the wiring 86 stored therein, and has a reflection surface 102a facing toward the inside of the casing 11. Furthermore, the height of the reflecting member 102 is equal to the height of the window portion 12, and the reflecting member 102 is mounted so as to be erected in the vertical direction, to cover a part of the window portion 12. In this structure, in a case where the emitted light L1 with which the scan region R is being scanned, intersects the wiring 86, the emitted light L1 is reflected by the reflection surface 102a. Therefore, the emitted light L1 is not applied to the wiring 86. The reflecting member 102 is fixed by screwing similarly to the reflecting member 101. That is, screw holding portions 82 extend from the upper and the lower ends of the reflecting member 102, and screw holes are formed in the respective screw holding portions 82. Screws 82a pass through the screw holes of the screw holding portions 82, and are screwed into the side wall 11a, thereby fixing the reflecting member 102.

Next, a method for discriminating between a received light signal based on the reflected light L2 from the object 91 and a received light signal based on the reflected light L2 from the reflecting member 101, in order to detect deviation of the scan position, will be described. Firstly, when a material for the reflecting member is selected or processed such that the reflectance of the reflecting member 101 and the reflectance of the surface of the object 91 to be measured are different from each other, an intensity is made different between the received light signal outputted by the light detector 16 when the reflected light L2 from the object 91 is received, and the received light signal outputted by the light detector 16 when the reflected light L2 from the reflecting member 101 is received, and the two received light signals can be discriminated from each other according to the difference in intensity.

Figure 9:
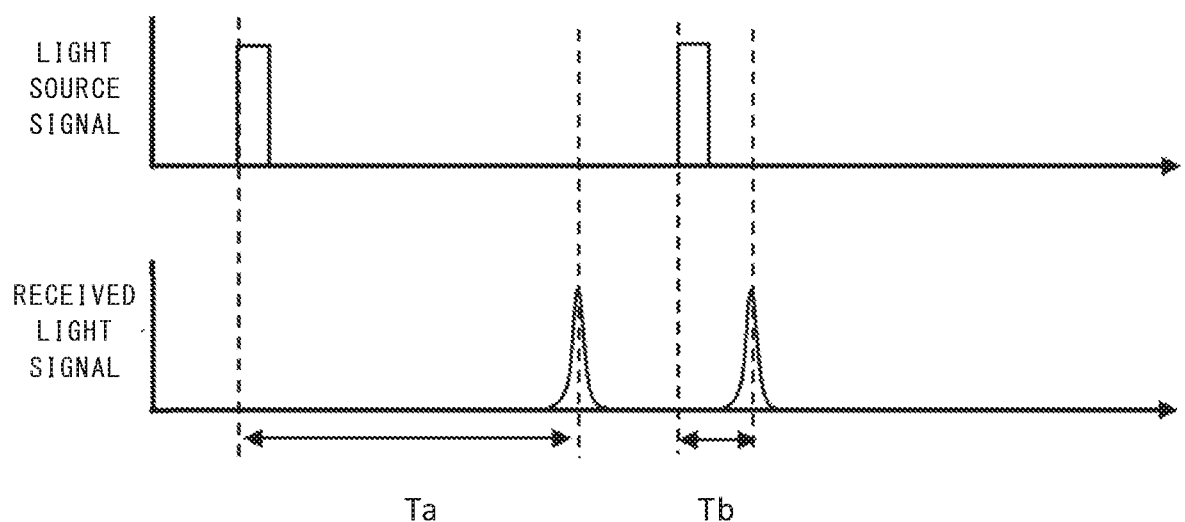
FIG. 9 illustrates an example of a method for discriminating light reflected by an object to be measured and light reflected by the reflecting member from each other.

Instead of the above-described discrimination method, a method in which the two received light signals are discriminated from each other according to difference in timing at which the reflected light is received, can be used. A time period from rising of the light source signal based on the emitted light L1 up to the peak of the received light signal based on the reflected light L2 depends on a distance between positions of the laser light source 13 and the light detector 16, and a position at which the emitted light L1 is reflected, and the longer the distance is, the longer the time period is. A time Ta represents a time from rising of the light source signal up to the peak of the received light signal in a case where the reflected light L2 from the object 91 is received by the light detector 16. A time Tb represents a time from rising of the light source signal up to the peak of the received light signal in a case where the reflected light L2 from the reflecting member 101 is received by the light detector 16. In this case, since the reflecting member 101 is disposed inside the distance measurement apparatus 10 and the object 91 is disposed outside the distance measurement apparatus 10, the time Ta is longer than the time Tb and the light receiving timing is different as shown in FIG. 9. The two received light signals can be discriminated from each other by utilizing difference in the light receiving time. Therefore, for example, in a case where a time after a time period corresponding to a distance in the distance measurement apparatus 10 is set as a measurement time region for the object 91, even when the two received light signals have the same intensity, the received light signal based on the object 91 and the received light signal based on the reflecting member 101 can be discriminated from each other.

In the above-described method, the received light signal based on the reflected light L2 from the object 91 and the received light signal based on the reflected light L2 from the reflecting member 101 can be discriminated from each other, whereby the received light signal based on the reflecting member 101 can be used as the position deviation detection signal, and deviation of the scan position is detected according to the presence or absence of the output of the position deviation detection signal or the difference in the timing. This will be described below in detail.

Figure 10A:
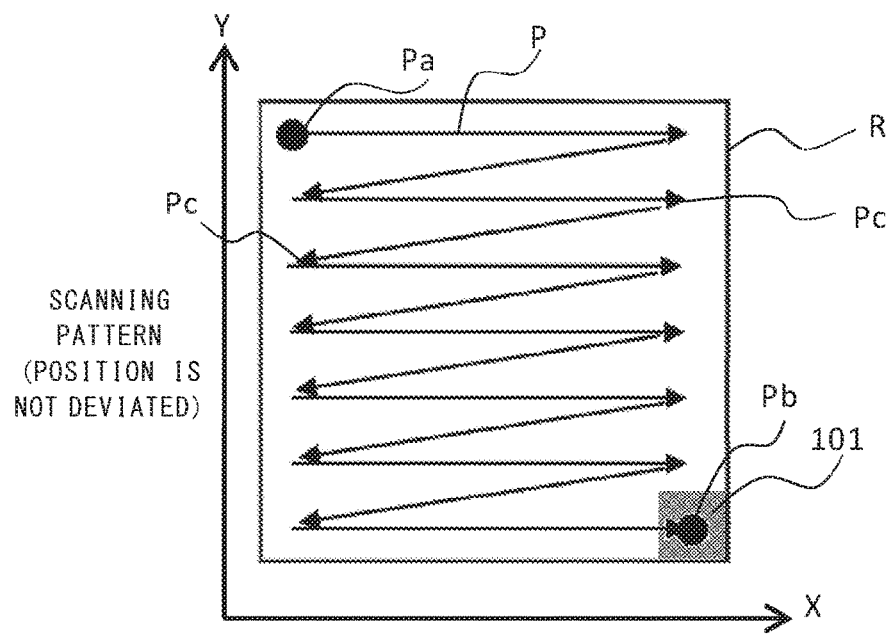
FIG. 10A illustrates a scanning pattern and a scan region by laser light according to the first embodiment, and illustrates a state where a scan position is not deviated.
Figure 10B:
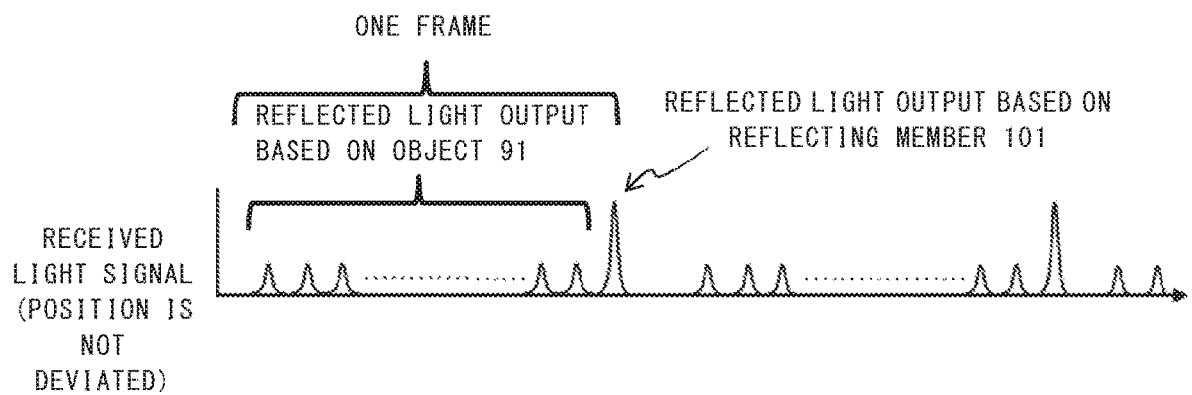
FIG. 10B illustrates a received light signal according to the first embodiment, and illustrates a state where a scan position is not deviated.

FIG. 10A illustrates a scanning pattern and a scan region in a state where a scan position is not deviated, and FIG. 10B illustrates a received light signal in a state where a scan position is not deviated. In FIG. 10B, the vertical axis represents the intensity of the received light signal, and the horizontal axis represents time. In a case where the scan position is not deviated, when the laser light source 13 is pulse-driven and emits light at regular intervals, to periodically emit the emitted light L1, the light detector 16 periodically receives the reflected light L2 from the object 91 or the reflecting member 101, and periodically outputs the received light signal as a reflected light output. Scanning with the emitted light L1 is performed by the MEMS mirror 15. The emitted light L1 is applied from the scan start position Pa to the scan end position Pb on the scan region R. When a collection of the received light signals outputted by the light detector 16 while a certain scanning pattern P is formed, is set as one frame, the reflected light output of each frame is formed from the reflected light outputs based on the object 91 and the reflected light output based on the reflecting member 101. In the first embodiment, since the reflecting member 101 is disposed at the scan end position Pb, only the final reflected light output of each frame is the reflected light output based on the reflecting member 101, and the other outputs are the reflected light outputs based on the object 91. The time at which the reflected light output is outputted is stored in the data processing unit 182. The scanning pattern P formed by the emitted light L1 is uniform, and the position of the reflecting member 101 is fixed, whereby each frame is uniform in general.

Figure 11A:
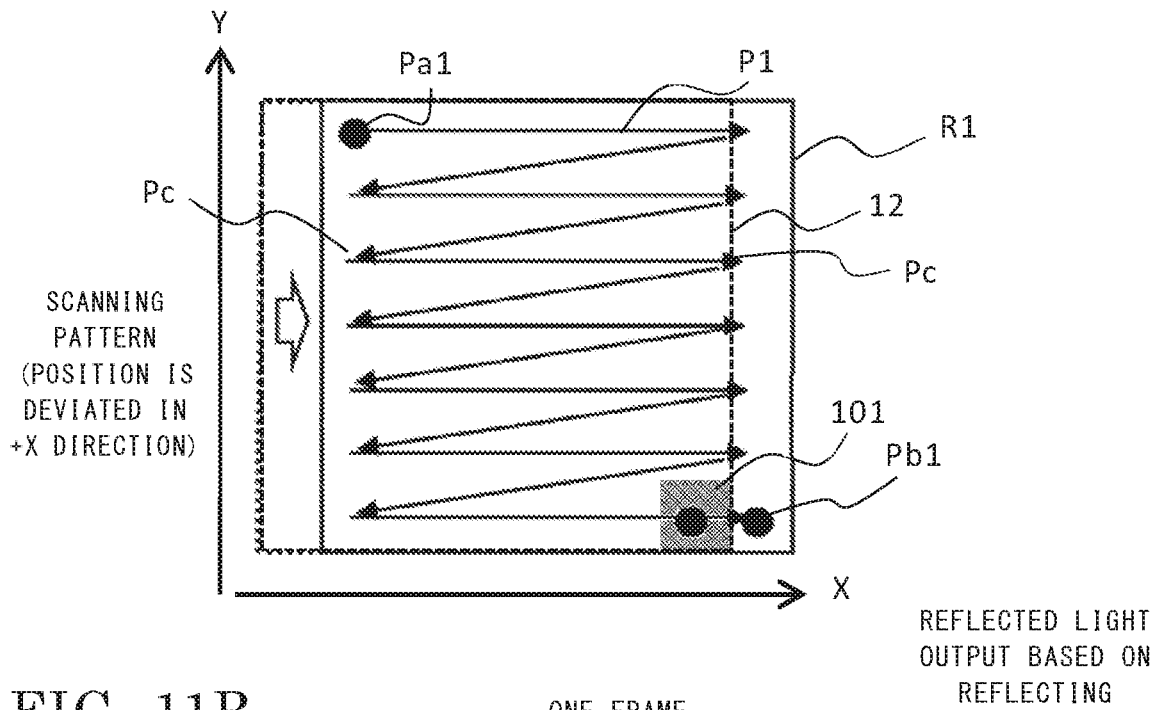
FIG. 11A illustrates a scanning pattern and a scan region by laser light according to the first embodiment, and illustrates a state where a scan position is deviated in the +X direction.
Figure 11B:
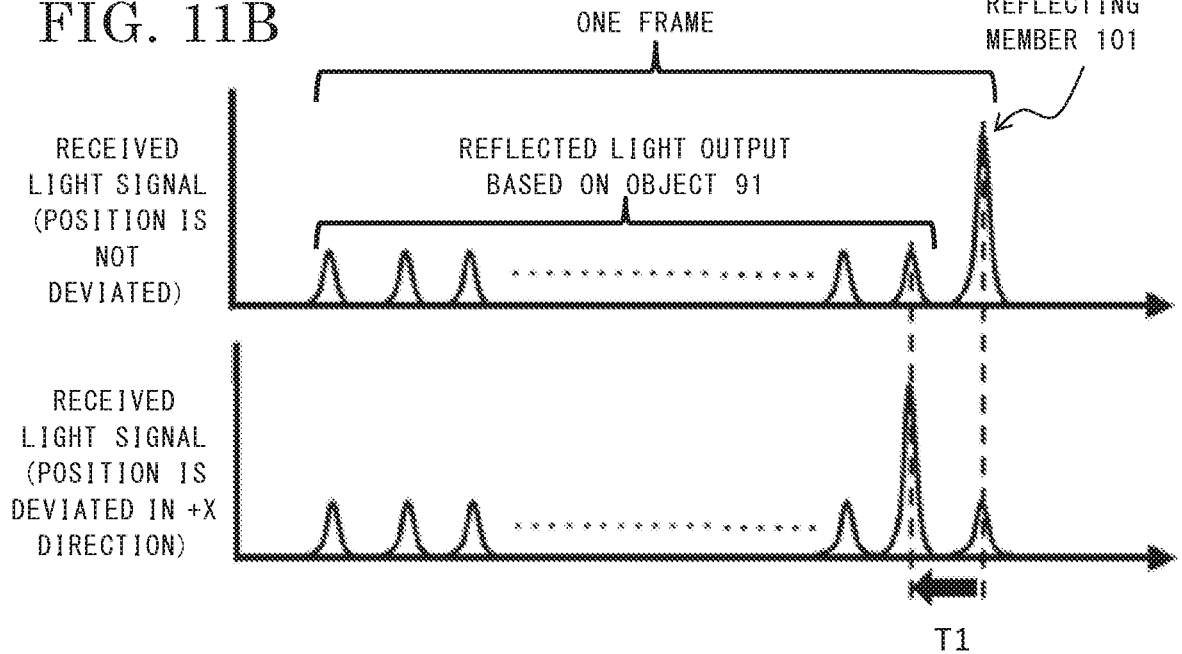
FIG. 11B illustrates change of a received light signal in a state where a scan position is deviated in the +X direction.

FIG. 11A illustrates a scanning pattern and a scan region in a state where a scan position is deviated in the +X direction. FIG. 11B illustrates change of a received light signal in a state where a scan position is deviated in the +X direction. The scan region R1, the scanning pattern P1, the scan start position Pa1, and the scan end position Pb1 shown in FIG. 11A correspond to the scan region R, the scanning pattern P, the scan start position Pa, and the scan end position Pb, shown in FIG. 10A, which have been subjected to deviation of the scan position in the +X direction. Also in this case, since the position at which the reflecting member 101 is mounted is not changed, the position at which the reflecting member 101 is mounted shifts in the −X side direction from the scan end position Pb1. Thus, the timing of the reflected light output based on the reflecting member 101 becomes earlier, whereby position deviation in the +X direction can be detected. Furthermore, an amount of scan position deviation can be calculated according to a scanning speed, and the magnitude of the difference T1 in timing of the reflected light output. In a case where the scan position is deviated in the −X direction, the position at which the reflecting member 101 is mounted is outside the scan region R1, and reflected light output based on the reflecting member 101 does not occur. Therefore, in a case where a position is deviated in the −X direction, although an amount of the scan position deviation cannot be calculated, whether or not the position has been deviated can be detected.

In a case where the reflecting member 101 is disposed at the scan start position Pa, when the scan position is deviated in the +X direction, reflected light output based on the reflecting member 101 does not occur, whereby the position deviation can be detected. In a case where the scan position is deviated in the −X direction, timing of the reflected light output based on the reflecting member 101 is delayed, and the position deviation is detected, and an amount of scan position deviation can be calculated. Although, in FIG. 11A and FIG. 11B, position deviation in the X direction is described, the same applies to the position deviation in the Y direction. In a case where the reflecting member 101 is disposed at the scan end position Pb, when the scan position is deviated in the −Y direction, timing of the reflected light output based on the reflecting member 101 becomes earlier, position deviation is detected, and an amount of scan position deviation can be calculated. In a case where the scan position is deviated in the +Y direction, reflected light output based on the reflecting member 101 does not occur, and the position deviation can be detected.

Figure 12:
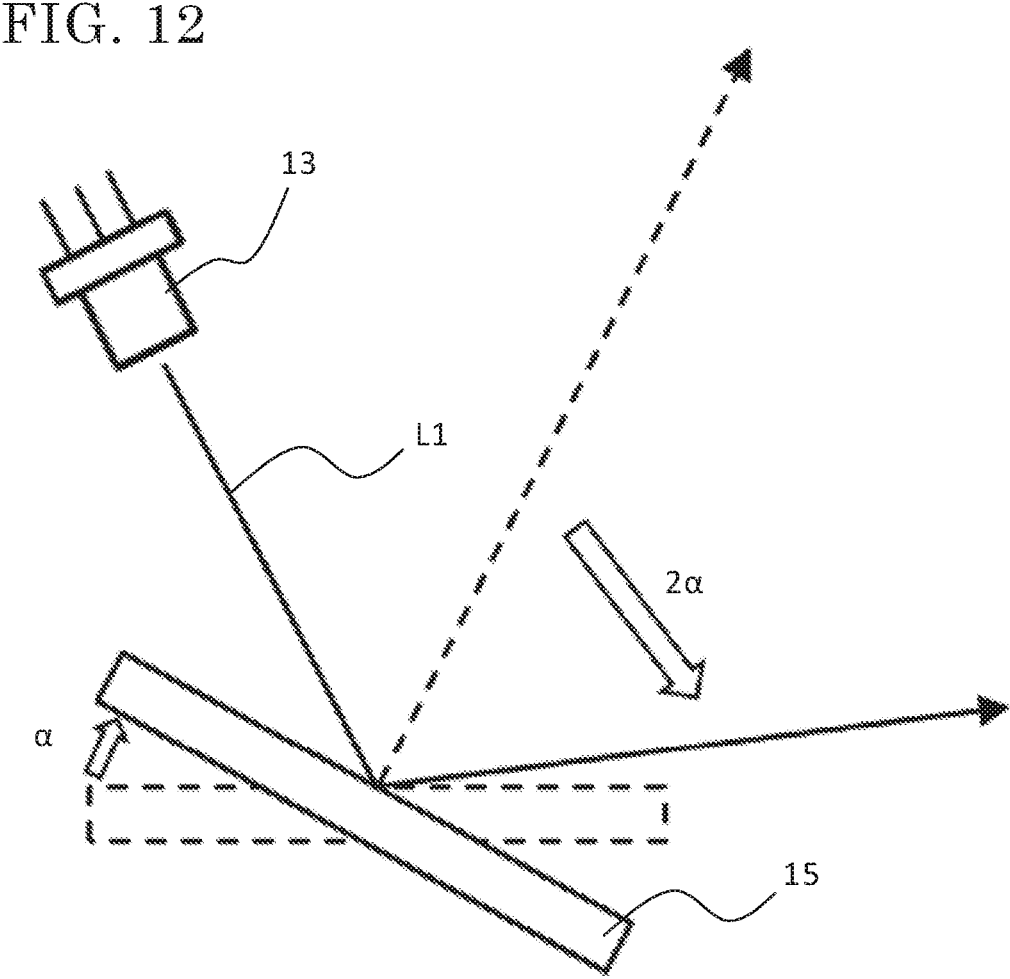
FIG. 12 illustrates a relationship between a driving angle and a scanning angle of the MEMS mirror.

Next, a method for correcting the detected deviation of the scan position will be described. Firstly, a time at which a position deviation detection signal is outputted in one frame in a state where scan position is not deviated, is obtained, and the time is previously stored as a reference time by the data processing unit 182. When deviation of the scan position is detected, the time at which the position deviation detection signal is outputted and the reference time are compared with each other, and an amount of scan position deviation is calculated as the number of scan points according to the magnitude of difference between the two times, and multiplied by an angular resolution, to calculate an amount of scanning angle deviation. The deviation of the scan position can be corrected by the MEMS mirror 15 being rotated in a direction opposite to the direction in which the scanning angle is deviated. As shown in FIG. 12, when the driving angle of the MEMS mirror 15 is changed by α, the scanning angle changes by 2α. When the deviation of the scan position is corrected, the MEMS mirror 15 is rotated by a distance obtained by an amount of the scanning angle deviation being multiplied by ½, whereby the deviation of the scan position can be corrected. The above-described calculation of an amount of scan position deviation and an amount of correction, is performed by the data processing unit 182 of the control unit 18. The data processing unit 182 transmits the calculated amount of correction to the system control unit 181, and the system control unit 181 transmits an instruction corresponding to the amount of correction to the drive circuit 151, to adjust the driving angle of the MEMS mirror 15.

In the first embodiment, the entirety of the window portion 12 corresponds to the scan region R. However, only a part of the window portion 12 may correspond to the scan region R when the reflecting member 101 can be mounted therein.

Furthermore, depending on the size of the casing 11 and a pulse emission time of the laser light source 13, the reflected light L2 from the reflecting member 101 and the emitted light L1 from the laser light source 13 may overlap each other in the casing 11, and the emitted light L1 and the reflected light L2 may interfere with each other. Therefore, interference between the emitted light L1 and the reflected light L2 may be controlled so as to be reduced by shortening the width of the pulse from the laser light source 13 when the reflecting member 101 is scanned.

According to the first embodiment, deviation of the scan position can be detected with a simple structure at enhanced accuracy. More specifically, by utilizing the configuration in which a received light signal obtained from light reflected by a reflecting member and a received light signal obtained from light reflected by the surface of an object can be discriminated from each other, the reflected light output based on the reflecting member is used as the position deviation detection signal, and deviation of the scan position is detected according to presence or absence of output of the position deviation detection signal or difference in timing. The light detector that receives reflected light from the reflecting member doubles as the light detector that receives reflected light from an object to be measured. Therefore, a light detector for detecting position deviation need not be separately provided. Thus, deviation of the scan position can be detected with a simple structure, and the size and cost of the distance measurement apparatus can be reduced. Furthermore, the laser light source control circuit controls an amount of light emitted from a laser light source so as not to saturate output of the light detector. Thus, reflectance of the reflecting member can be set to be high, and heat generation due to absorption of emitted light is inhibited. As a result, deformation and aged deterioration due to heat generation are inhibited, and change of the reflectance of the reflecting member can be inhibited. Therefore, the reflected light output based on the reflecting member becomes stable, and position deviation can be detected at enhanced accuracy.

Second Embodiment

Figure 13A:
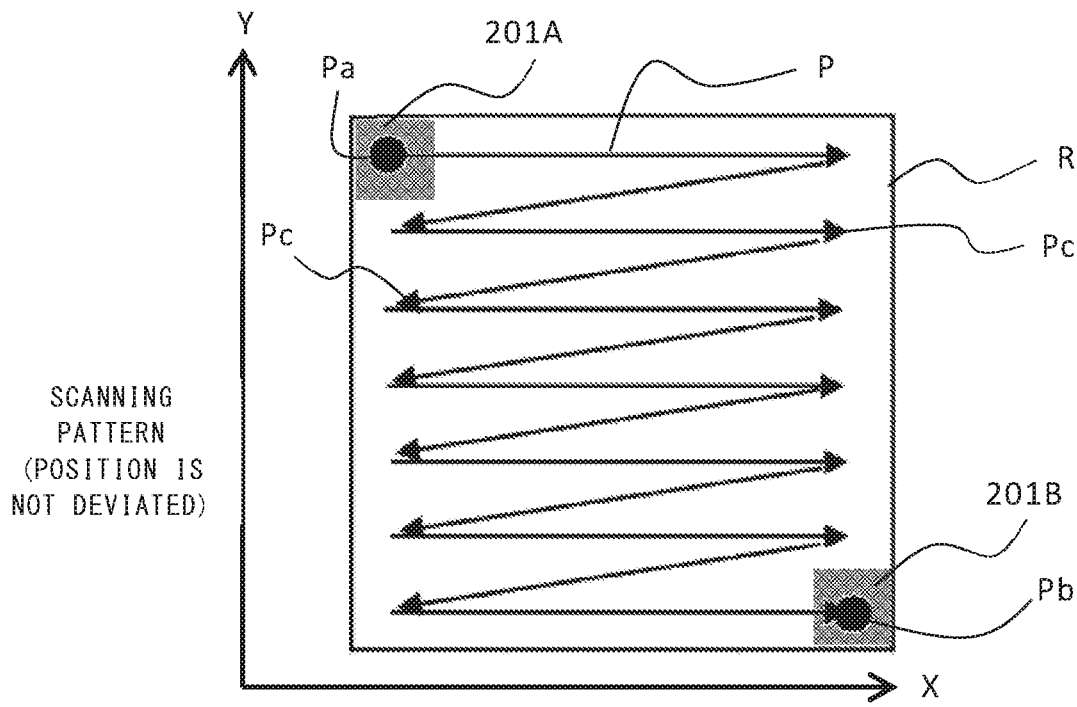
FIG. 13A illustrates a scanning pattern and a scan region by laser light according to a second embodiment, and illustrates a state where position deviation does not occur in a scan region.
Figure 13B:
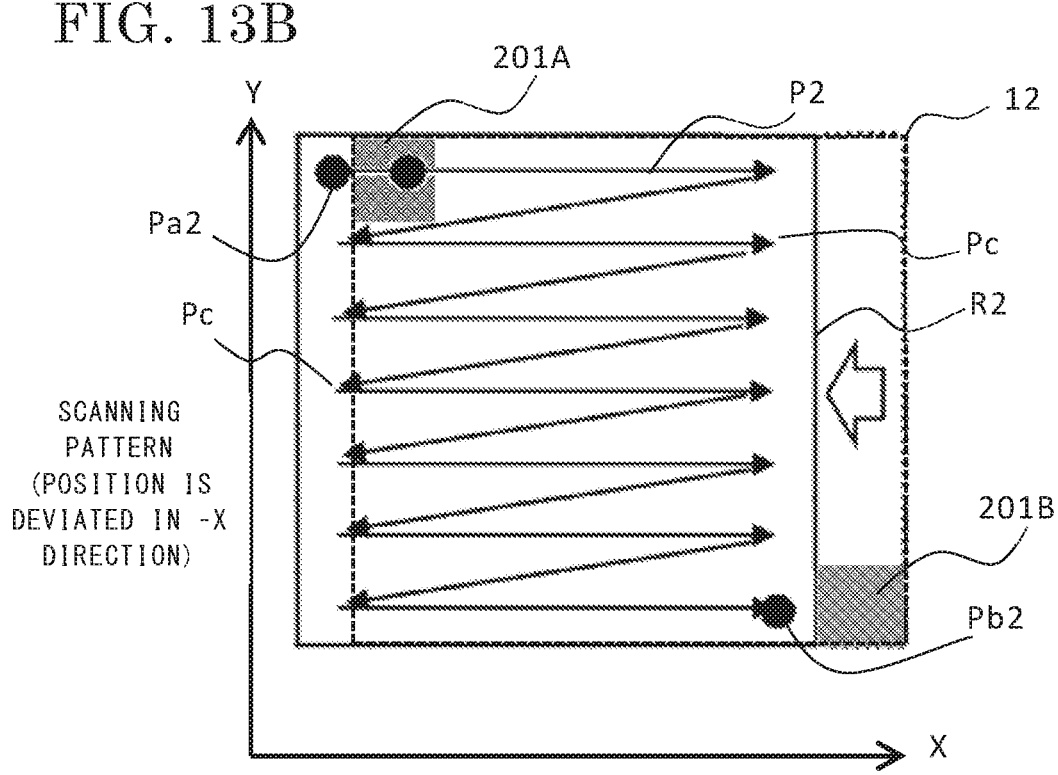
FIG. 13B illustrates a scanning pattern and a scan region by laser light according to the second embodiment, and illustrates a state where a scan position is deviated in the −X direction.

A second embodiment will be described below with reference to FIG. 13A to FIG. 14. The same components as those shown in FIG. 1 to FIG. 12 or components corresponding thereto are denoted by the same reference numerals, and the description thereof is omitted. The second embodiment is different from the first embodiment in that the reflecting member is also disposed at the scan start position in the second embodiment. FIG. 13A illustrates a scanning pattern and a scan region by laser light according to the second embodiment, and illustrates a state where position deviation does not occur in a scan region. FIG. 13B illustrates a scanning pattern and a scan region by laser light according to the second embodiment, and illustrates a state where the scan position is deviated in the −X direction. In the second embodiment, two reflecting members are used as reflecting means, and reflecting members 201A and 201B are disposed at a scan start position Pa and a scan end position Pb, respectively, of a scanning pattern P. A method in which each reflecting member is mounted is the same as described for the first embodiment.

When the scan position is deviated in the −X direction, the scan region R, the scanning pattern P, the scan start position Pa, and the scan end position Pb are also deviated in the −X direction to the scan region R2, the scanning pattern P2, the scan start position Pa2, and the scan end position Pb2, respectively. Also in this case, the position at which the reflecting member 201A is mounted is not changed. Therefore, the position at which the reflecting member 201A is mounted shifts in the +X side direction from the scan start position Pa2. The position at which the reflecting member 201B is mounted is not changed. Therefore, the position at which the reflecting member 201B is mounted shifts in the +X side direction from the scan end position Pb2, and is outside the scan region R2.

Figure 14:
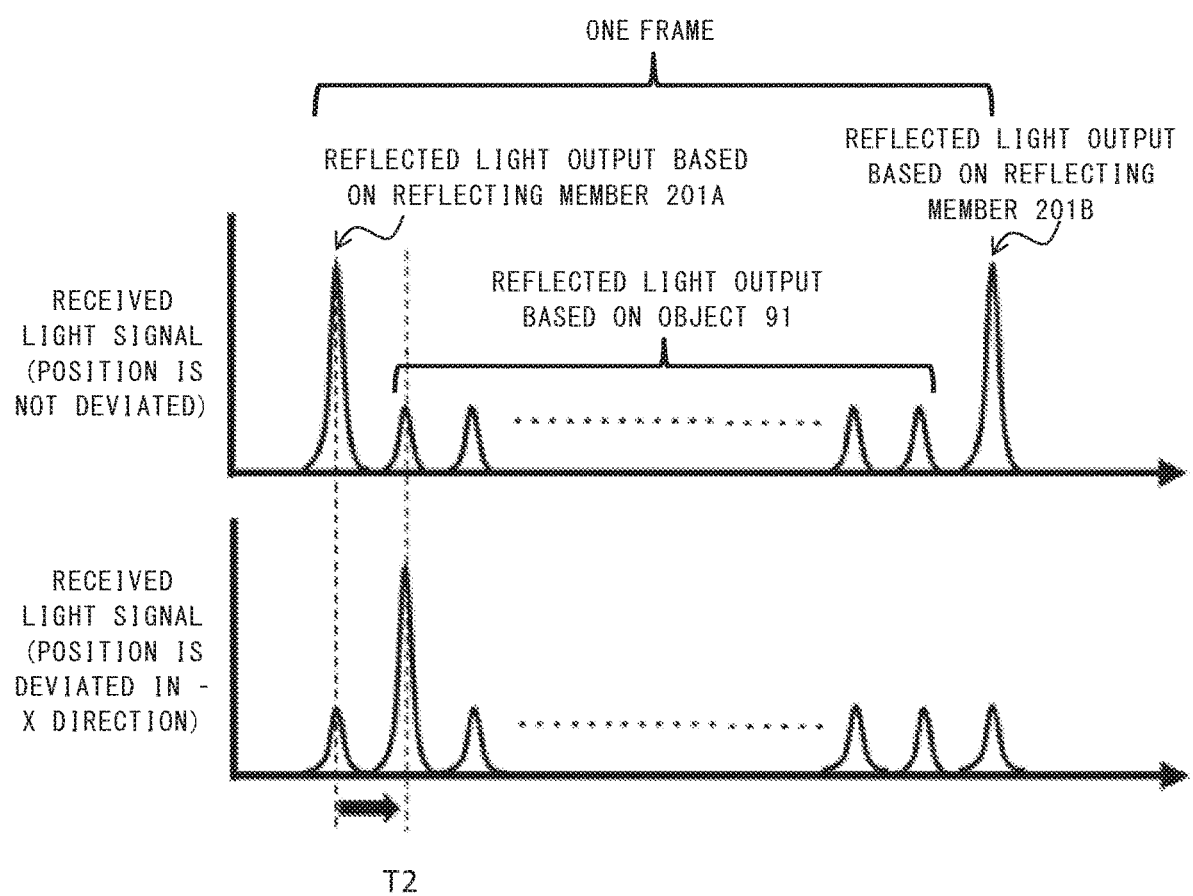
FIG. 14 illustrates change of a received light signal in a state where a scan position is deviated in the −X direction.

FIG. 14 illustrates change of a received light signal in a state where a scan position is deviated in the −X direction. When the position at which the reflecting member 201A is mounted shifts in the +X side direction from the scan start position Pa2, timing of the reflected light output based on the reflecting member 201A is delayed by T2, and position deviation in the −X direction can be detected. Furthermore, an amount of scan position deviation can be calculated according to the magnitude of T2 and the scanning speed. The position at which the reflecting member 201B is mounted is outside the scan region R2 and reflected light output based on the reflecting member 201B does not occur, whereby position deviation in the −X direction can be detected. In a case where the scan position is deviated in the +X direction, timing of reflected light output based on the reflecting member 201B becomes earlier, thereby detecting position deviation and calculating an amount of scan position deviation, as in the first embodiment. The position at which the reflecting member 201A is mounted is outside the scan region R2, and the reflected light output based on the reflecting member 201A does not occur, thereby detecting position deviation in the +X direction.

The other configuration is the same as in the first embodiment, and the description thereof is omitted.

According to the second embodiment, the same effect as in the first embodiment can be obtained.

Furthermore, regardless of whether the scan point is deviated in the +X direction or the −X direction, an amount of scan position deviation can be calculated. More specifically, since the reflecting members are disposed at both the scan start position and the scan end position, the magnitude of difference in timing at which the position deviation detection signal is outputted can be obtained in whichever direction the position is deviated, and an amount of scan position deviation can be calculated.

Furthermore, since the two reflecting members are used, even if a reflectance of one of the reflecting members is lowered, deviation of the scan position can be detected. The reflectance of the surface of the reflecting member may change due to deterioration or occurrence of tilting. When the reflectance becomes excessively low, the reflectance of the reflecting member becomes almost equal to the reflectance of the surface of an object, whereby the reflected light output based on the reflecting member cannot be discriminated or the reflected light output may not occur even when position is not deviated. In the second embodiment, two reflecting members are used, whereby two position deviation detection signals are used. Therefore, even when failure occurs in one of the reflecting members, deviation of the scan position can be detected.

Third Embodiment

Figure 15:
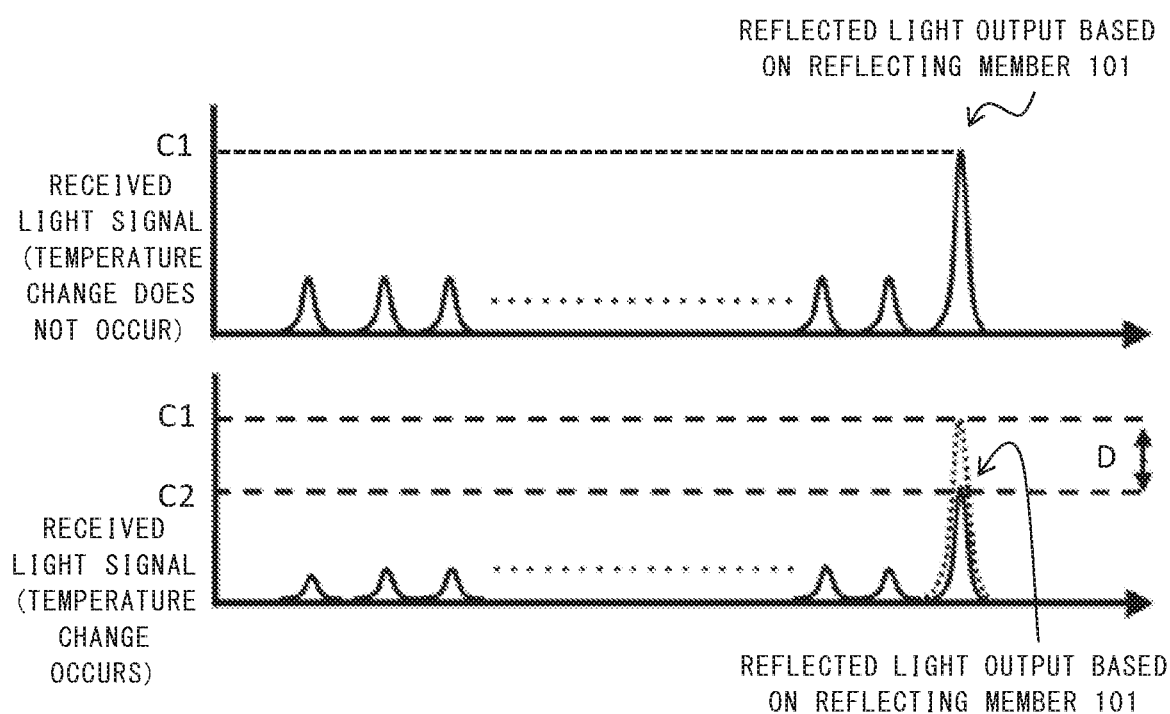
FIG. 15 illustrates change of a received light signal due to temperature change.

A third embodiment will be described below with reference to FIG. 15. The same components as those shown in FIG. 1 to FIG. 14 or components corresponding thereto are denoted by the same reference numerals, and the description thereof is omitted. In the third embodiment, intensity of a received light signal outputted by the light detector 16 is adjusted. An APD used as a light receiving element of the light detector 16 allows high sensitivity to be obtained by avalanche amplification, but an amplification factor varies due to temperature change. In the third embodiment, a reference value C1 of intensity of a received light signal is previously stored by the data processing unit 182. In a case where the intensity of a received light signal becomes C2 due to temperature change as shown in FIG. 15, the system control unit 181 compares the intensity C2 of the received light signal received by the light detector 16 and the reference value C1 with each other, and calculates the difference therebetween as a signal change amount D. When the signal change amount D is greater than a predetermined allowable value, the system control unit 181 calculates a laser light source control amount according to the signal change amount D, and instructs the laser light source control circuit 131 to change the intensity of the emitted light L1 by the laser light source control amount. The laser light source control circuit 131 adjusts the intensity of the emitted light L1 according to the instruction from the system control unit 181. Thus, the intensity of the reflected light L2 received by the light detector 16 is also adjusted and corrected such that a difference between the intensity C2 of the received light signal outputted by the light detector 16 and the reference value C1 is less than or equal to the allowable value.

As the reference value C1, for example, a theoretical value or an initial value of the reflected light output based on the reflecting member 101 may be used. For the reference value of the received light signal and the comparison, the reflected light output based on the object 91 can be used. However, when the reflected light output which is based on the reflecting member 101 and has a relatively great value is used, a signal change amount and a control amount can be calculated at enhanced accuracy. In the third embodiment, the intensity of the emitted light L1 is adjusted, whereby the intensity of the received light signal is corrected. However, the intensity of the received light signal may be corrected by the sensitivity of the light detector 16 being adjusted.

The other configuration is the same as in the first embodiment, and the description thereof is omitted.

According to the third embodiment, the same effect as in the first embodiment can be obtained.

Furthermore, change of characteristics of the light receiving element due to temperature change can be addressed with a simple structure. More specifically, the reference value of the intensity of the received light signal is previously stored, and, when a difference between the reference value and an actual intensity is greater than an allowable value, the intensity of the emitted light is adjusted and corrected such that difference from the reference value is less than or equal to the allowable value. Therefore, temperature compensation for an APD can be performed without using a temperature measurement device such as a thermistor, whereby change of characteristics of the light receiving element due to temperature change can be addressed with a simple structure. Thus, error in distance measurement due to change of an amplification factor can be inhibited while the configuration is prevented from being complicated. Furthermore, the number of components can be reduced.

Correction of the intensity of the received light signal described in the third embodiment can be applied to not only APDs but also photodiodes in general. Furthermore, change of characteristics of the light receiving element due to aged deterioration as well as change of the characteristics of the light receiving element due to temperature change can be addressed.

Fourth Embodiment

A fourth embodiment will be described below with reference to FIG. 16A to FIG. 17. The same components as those shown in FIG. 1 to FIG. 15 or components corresponding thereto are denoted by the same reference numerals, and the description thereof is omitted. In the fourth embodiment, phase difference between scanning in the X direction and scanning in the Y direction is detected.

Figure 16A:
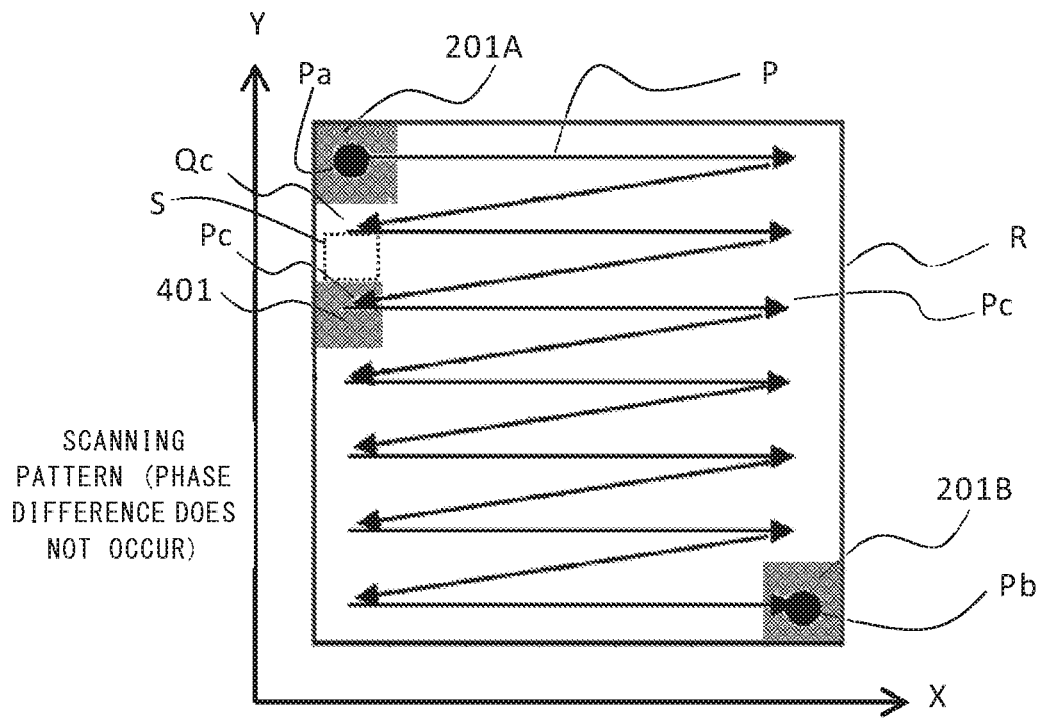
FIG. 16A illustrates a scanning pattern and a scan region by laser light according to a fourth embodiment, and illustrates a state where phase difference does not occur.
Figure 16B:
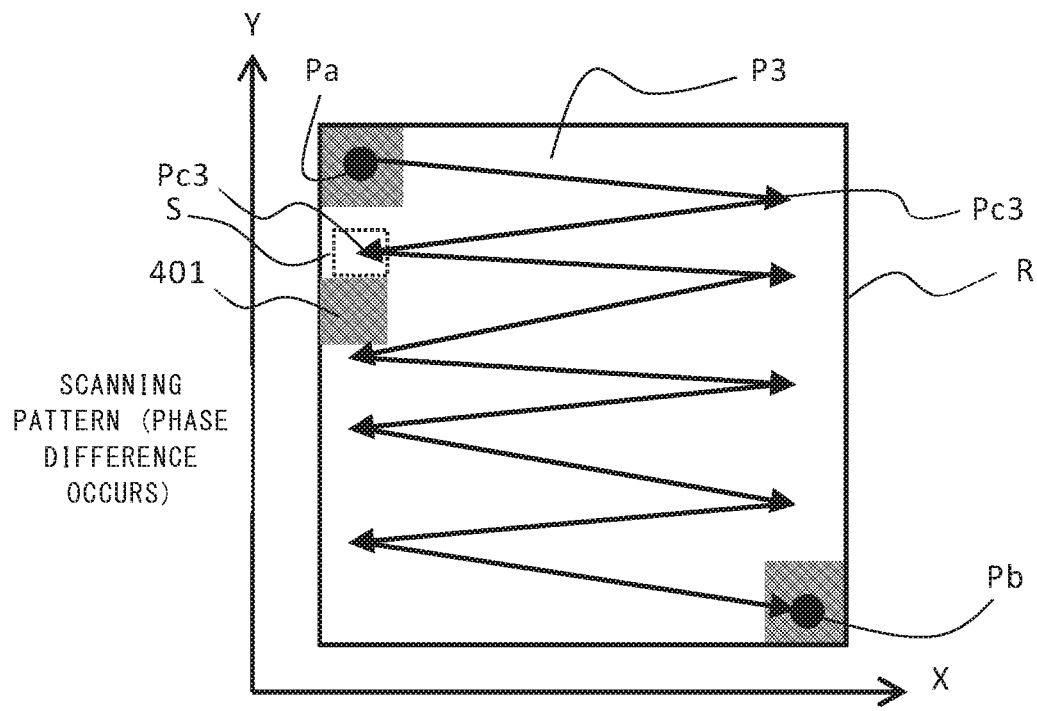
FIG. 16B illustrates a scanning pattern and a scan region by laser light according to the fourth embodiment, and illustrates a state where phase difference occurs.

FIG. 16A illustrates a scanning pattern and a scan region by laser light according to the fourth embodiment, and illustrates a state where phase difference does not occur. FIG. 16B illustrates a state where phase difference occurs. Similarly to the second embodiment, reflecting members 201A and 201B are disposed at the scan start position Pa and the scan end position Pb, respectively, of the scanning pattern P. Furthermore, in the fourth embodiment, the reflecting means includes a reflecting member 401 for detecting phase difference. The reflecting member 401 is mounted so as to correspond to a turning position Pc of the scanning pattern P. The width of the reflecting member 401 in the Y direction is less than a distance between scanning lines of the scanning pattern P. Therefore, the reflecting member 401 covers the turning position Pc, but does not cover another turning position Qc that is adjacent to the turning position Pc along the Y direction, and a region S in which the emitted light L1 is not reflected and transmitted to the object 91 is formed between the other turning position Qc and the reflecting member 401.

When the MEMS mirror 15 is driven to rotate in the X direction and the Y direction at a desired frequency, and phase difference does not occur, the scanning pattern P overlaps the reflecting member 401 at the turning position Pc as shown in FIG. 16A. Therefore, the emitted light L1 is reflected at the turning position Pc by the reflecting member 401. When phase difference occurs between the rotation in the Y direction scanning and the rotation in the X direction scanning, and a scanning pattern P3 as shown in FIG. 16B is formed, the scan start position and the scan end position are not changed, but the turning position deviates in the Y direction, and the scanning pattern P3 is turned at a turning position Pc3 in the region S. Therefore, the scanning pattern P3 does not pass through the position at which the reflecting member 401 is mounted.

Figure 17:
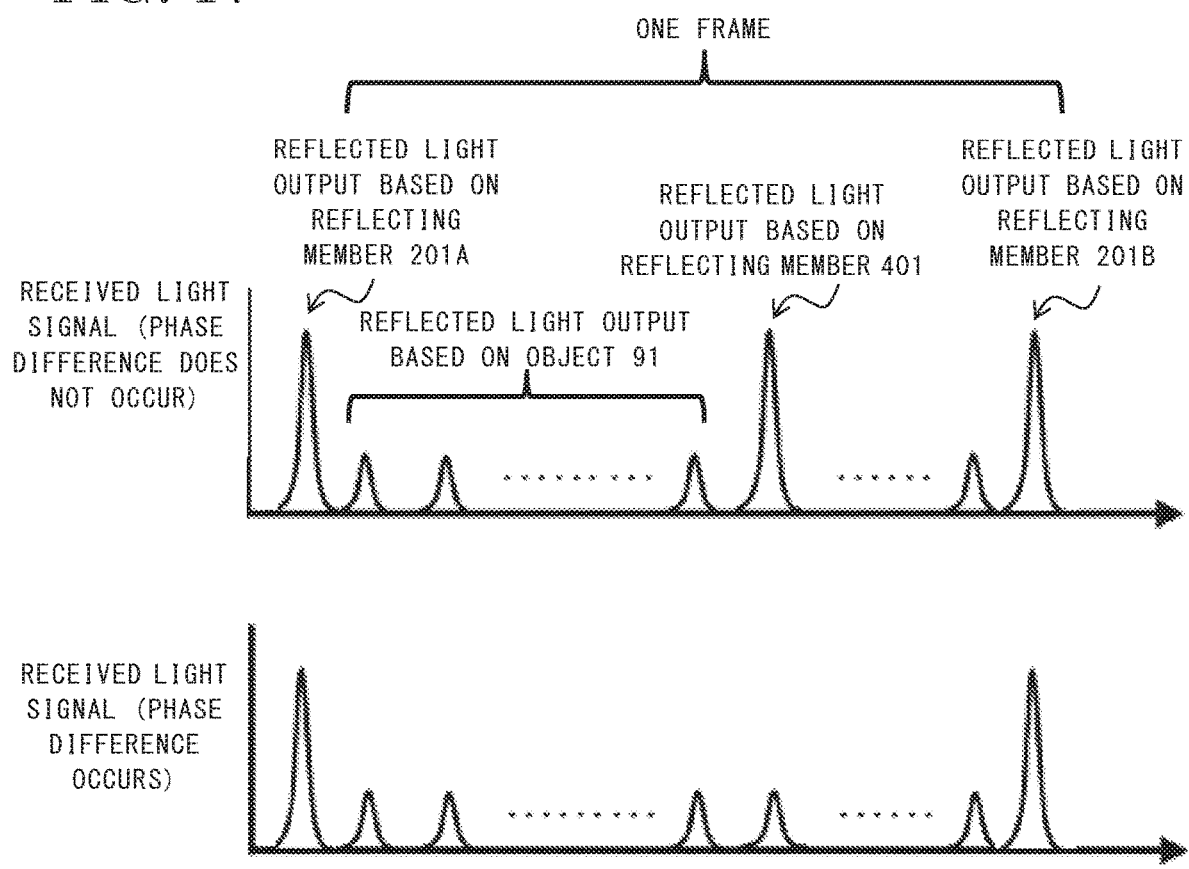
FIG. 17 illustrates change of a received light signal in a state where phase difference occurs.

FIG. 17 illustrates change of a received light signal in a state where phase difference occurs. As shown in FIG. 17, when phase difference does not occur, the reflected light outputs in one frame are three outputs based on the reflecting members 201A, 201B, and 401. When phase difference occurs, the scanning pattern P3 does not pass through the reflecting member 401, and, thus, the reflected light output based on the reflecting member 401 does not occur, and the reflected light outputs based on the reflecting members in one frame are merely two outputs based on the reflecting members 201A and 201B. Therefore, phase difference can be detected according to whether or not the reflected light output based on the reflecting member 401 occurs.

The other configuration is the same as in the second embodiment, and the description thereof is omitted.

According to the fourth embodiment, the same effect as in the second embodiment can be obtained.

Phase difference between the X direction scanning and the Y direction scanning can be detected. More specifically, a reflecting member for detecting phase difference is disposed in at least one of turning positions of the scanning pattern. The width, in the Y direction, of the reflecting member for detecting phase difference is less than a distance between the scanning lines, and a region that allows laser light to pass therethrough is formed between the adjacent turning positions. Therefore, when the turning position is deviated along the Y direction due to phase difference, the scanning pattern does not pass through the reflecting member for detecting phase difference, and the reflected light output based on the reflecting member for detecting phase difference does not occur. Thus, phase difference can be detected according to whether or not the reflected light output based on the reflecting member for detecting phase difference occurs. Therefore, for example, in a case where two MEMS mirrors are disposed, and the scanning direction of one of the MEMS mirrors is set as the X direction, and the scanning direction of the other of the MEMS mirrors is set as the Y direction, if the scanning pattern cannot be obtained as desired although the scan position is not deviated when, for example, the relationship in phase between the MEMS mirrors is not proper, and phase difference occurs due to malfunctioning of the coil or the torsion bar, phase difference is detected, thereby detecting the malfunction.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 distance measurement apparatus
11 casing
11a side wall
12 window portion
13 laser light source
131 laser light source control circuit
15 MEMS mirror
16 light detector 18 control unit
182 data processing unit
91 object
101, 102, 201A, 201B, 401 reflecting member
102a reflection surface
C1 reference value
D signal change amount
L1 emitted light
L2 reflected light
P, P1, P2, P3 scanning pattern
Pa, Pa1, Pa2 scan start position
Pb, Pb1, Pb2 scan end position
Pc, Pc3, Qc turning position
R, R1, R2 scan region
S region

What is claimed is:

1. A distance measurement apparatus for applying laser light to an object to be measured and measuring a distance to the object to be measured, based on light reflected by the object to be measured, the distance measurement apparatus comprising:
a laser light source configured to emit the laser light;
a laser light source control circuit, the laser light source control circuit comprising a processor for executing a program, and a storage device in which the program is stored, the processor executing the program to perform the operation of controlling the laser light source;
scanning means for two-dimensionally scanning the object to be measured with the laser light;
a casing configured to store the scanning means;
an opening formed in the casing, the opening being opened toward the object to be measured, the opening allowing the object to be measured to be exposed to the scanning means;
a reflecting means fixed to the casing for covering a part of a scan region by the laser light or a periphery of the scan region and reflecting the laser light; and
a light receiving means for receiving first light reflected by the object to be measured and second light reflected by the reflecting means, and outputting a received light signal,
wherein the laser light source control circuit is configured to apply a feedback control to the laser light source based on a feedback of the second light reflected from the reflecting means.

2. The distance measurement apparatus according to claim 1, wherein the laser light source control circuit reduces power source voltage of the laser light source at timing when the light receiving means receives light reflected by the reflecting means.

3. The distance measurement apparatus according to claim 2, wherein
the scanning means performs while turning, at an end of the scan region, a scanning line extending in a first direction, scanning with the laser light in a second direction orthogonal to the first direction, and
the reflecting means covers a turning position of the scanning line, and forms a region that allows the laser light to pass therethrough, between the turning position and another turning position adjacent to the turning position.

4. The distance measurement apparatus according to claim 3, wherein change of an intensity of the received light signal from a predetermined reference value is calculated as a signal change amount and when the signal change amount is greater than an allowable value, output of the laser light source is adjusted based on the signal change amount.

5. The distance measurement apparatus according to claim 2, wherein change of an intensity of the received light signal from a predetermined reference value is calculated as a signal change amount and when the signal change amount is greater than an allowable value, output of the laser light source is adjusted based on the signal change amount.

6. The distance measurement apparatus according to claim 1, wherein the laser light source control circuit shortens a pulse width of the laser light at timing when the light receiving means receives light reflected by the reflecting means.

7. The distance measurement apparatus according to claim 6, wherein
the scanning means performs while turning at an end of the scan region, a scanning line extending in a first direction, scanning with the laser light in a second direction orthogonal to the first direction, and
the reflecting means covers a turning position of the scanning line and forms a region that allows the laser light to pass therethrough, between the turning position and another turning position adjacent to the turning position.

8. The distance measurement apparatus according to claim 7, wherein change of an intensity of the received light signal from a predetermined reference value is calculated as a signal change amount and when the signal change amount is greater than an allowable value, output of the laser light source is adjusted based on the signal change amount.

9. The distance measurement apparatus according to claim 6, wherein change of an intensity of the received light signal from a predetermined reference value is calculated as a signal change amount and when the signal change amount is greater than an allowable value, output of the laser light source is adjusted based on the signal change amount.

10. The distance measurement apparatus according to claim 1, wherein
the scanning means performs while turning at an end of the scan region, a scanning line extending in a first direction, scanning with the laser light in a second direction orthogonal to the first direction, and
the reflecting means covers a turning position of the scanning line and forms a region that allows the laser light to pass therethrough, between the turning position and another turning position adjacent to the turning position.

11. The distance measurement apparatus according to claim 10, wherein change of an intensity of the received light signal from a predetermined reference value is calculated as a signal change amount and when the signal change amount is greater than an allowable value, output of the laser light source is adjusted based on the signal change amount.

12. The distance measurement apparatus according to claim 1, wherein change of an intensity of the received light signal from a predetermined reference value is calculated as a signal change amount and when the signal change amount is greater than an allowable value, output of the laser light source is adjusted based on the signal change amount.

13. The distance measurement apparatus of claim 1, wherein the feedback control is configured such that an amount of the laser light emitted by the laser light source is less than a threshold value and avoids a saturation of an output of the light receiving means, and the threshold value is configured based on an amount of light at which an output of the light receiving means is saturated.

* * * * *